(12) United States Patent
Atwater et al.

(10) Patent No.: US 7,480,999 B2
(45) Date of Patent: Jan. 27, 2009

(54) FOOD PRESENTATION SYSTEM AND ASSEMBLY THEREFOR

(75) Inventors: Andrea E. Atwater, Barrington, IL (US); Andrew J Bartoli, Arlington Heights, IL (US)

(73) Assignees: Andrea Atwater, Barrington, IL (US); Kirby Atwater, Barrington, IL (US)

( * ) Notice: Subject to any disclaimer, the term of this patent is extended or adjusted under 35 U.S.C. 154(b) by 64 days.

(21) Appl. No.: 11/502,762

(22) Filed: Aug. 11, 2006

(65) Prior Publication Data

US 2006/0272466 A1 Dec. 7, 2006

Related U.S. Application Data

(63) Continuation-in-part of application No. 10/459,821, filed on Jun. 11, 2003, now abandoned.

(51) Int. Cl.
B26B 29/06 (2006.01)

(52) U.S. Cl. .............................. 30/289; 30/302; 30/303; 30/315; 30/316

(58) Field of Classification Search ................... 30/289, 30/302, 303, 312, 315, 316; 217/30; 220/531; 229/120.31, 120.36; 249/132, 170, 171, 249/203; 312/120, 123, 348.3
See application file for complete search history.

(56) References Cited

U.S. PATENT DOCUMENTS

| 410,682 | A | | 9/1889 | Berry |
|---|---|---|---|---|
| 431,958 | A | | 7/1890 | Woulf |
| 489,647 | A | | 1/1893 | Coe |
| 1,175,512 | A | | 3/1916 | Flemal |
| 1,290,186 | A | | 1/1919 | Held |
| 1,364,863 | A | | 1/1921 | Buchtel |
| 1,697,902 | A | | 1/1929 | Burke |
| 1,754,541 | A | | 4/1930 | Benoit |
| 1,934,996 | A | * | 11/1933 | Scalise ........................ 30/114 |
| 2,118,211 | A | | 5/1938 | Lutz |
| 2,338,007 | A | * | 12/1943 | Morris ........................ 30/351 |
| 2,424,015 | A | * | 7/1947 | Booker ........................ 30/302 |
| 3,005,260 | A | | 10/1961 | Muse |
| 3,276,918 | A | | 10/1966 | Langenecker |
| 3,677,168 | A | * | 7/1972 | Bell ............................ 99/645 |
| 4,000,845 | A | | 1/1977 | Zeller |
| 4,327,489 | A | | 5/1982 | Conrad |
| 4,442,604 | A | | 4/1984 | Altman |
| 4,648,300 | A | | 3/1987 | Hassenfelt |
| 5,046,388 | A | | 9/1991 | Mendenhall |
| 5,062,356 | A | | 11/1991 | Frankowski |
| 5,074,777 | A | * | 12/1991 | Garner ....................... 425/289 |
| 5,297,345 | A | * | 3/1994 | Jaakola ....................... 30/348 |
| 5,343,623 | A | | 9/1994 | Cole |
| 5,526,972 | A | | 6/1996 | Frazier et al. |
| 5,579,582 | A | | 12/1996 | Carlson |

(Continued)

*Primary Examiner*—Timothy V Eley
(74) *Attorney, Agent, or Firm*—Chris Scott

(57) ABSTRACT

A foldable blade assembly enables users to section and display a food preparation within a food preparation container. The blade assembly comprises radially orientable cutting blades sized and shaped to fit within a food preparation container for sectioning and displaying the food preparation. A centralized hinge structure hingedly connects the cutting blades providing structure for pivotally changing the relationship between the cutting blades from radially orientable blade configuration to a substantially coplanar arrangement for storage. A manually removable handle assembly is provided to enable manual force perpendicular to the cutting blades for sectioning the food preparation.

20 Claims, 19 Drawing Sheets

U.S. PATENT DOCUMENTS

| | | |
|---|---|---|
| 5,597,113 A | 1/1997 | Bradford |
| 5,848,470 A | 12/1998 | Anderson |
| 5,904,798 A | 5/1999 | Bradford et al. |
| 5,960,548 A | 10/1999 | Eldridge |
| 6,276,918 B1 | 8/2001 | Anderson |
| 6,279,469 B1 | 8/2001 | Bailey |
| 2004/0020055 A1* | 2/2004 | Zuker .................. 30/114 |

* cited by examiner

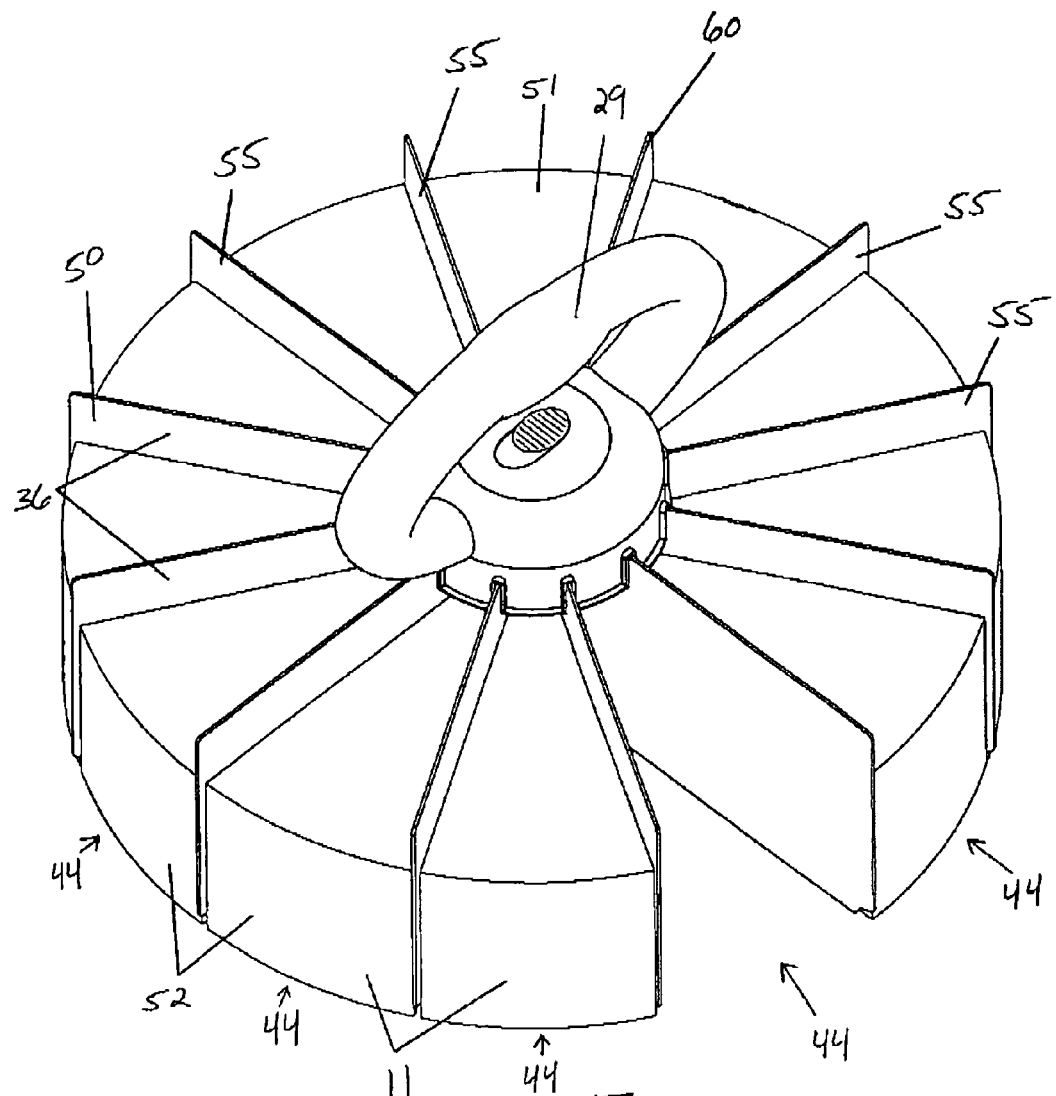
FIG. 3
FIG. 3(a)

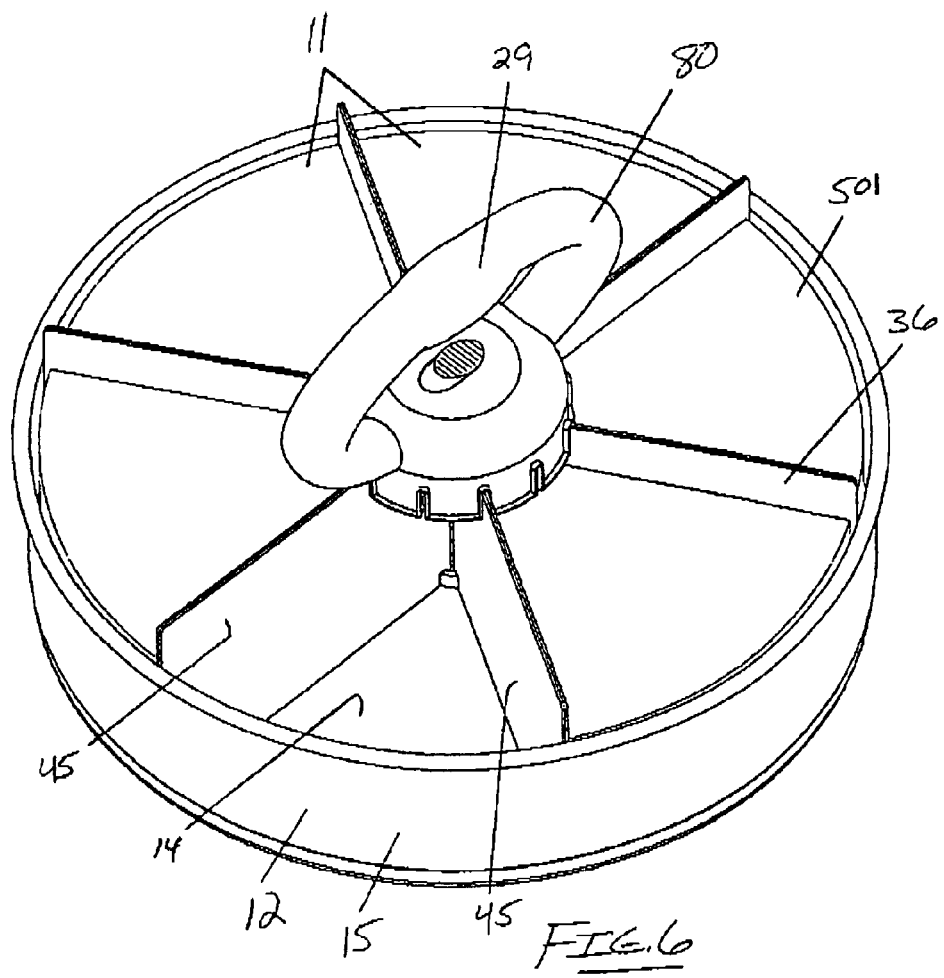
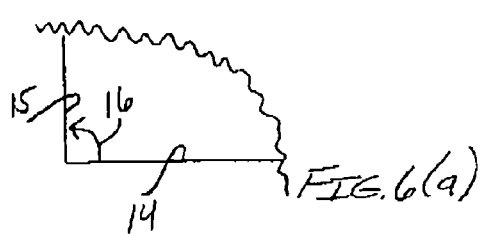

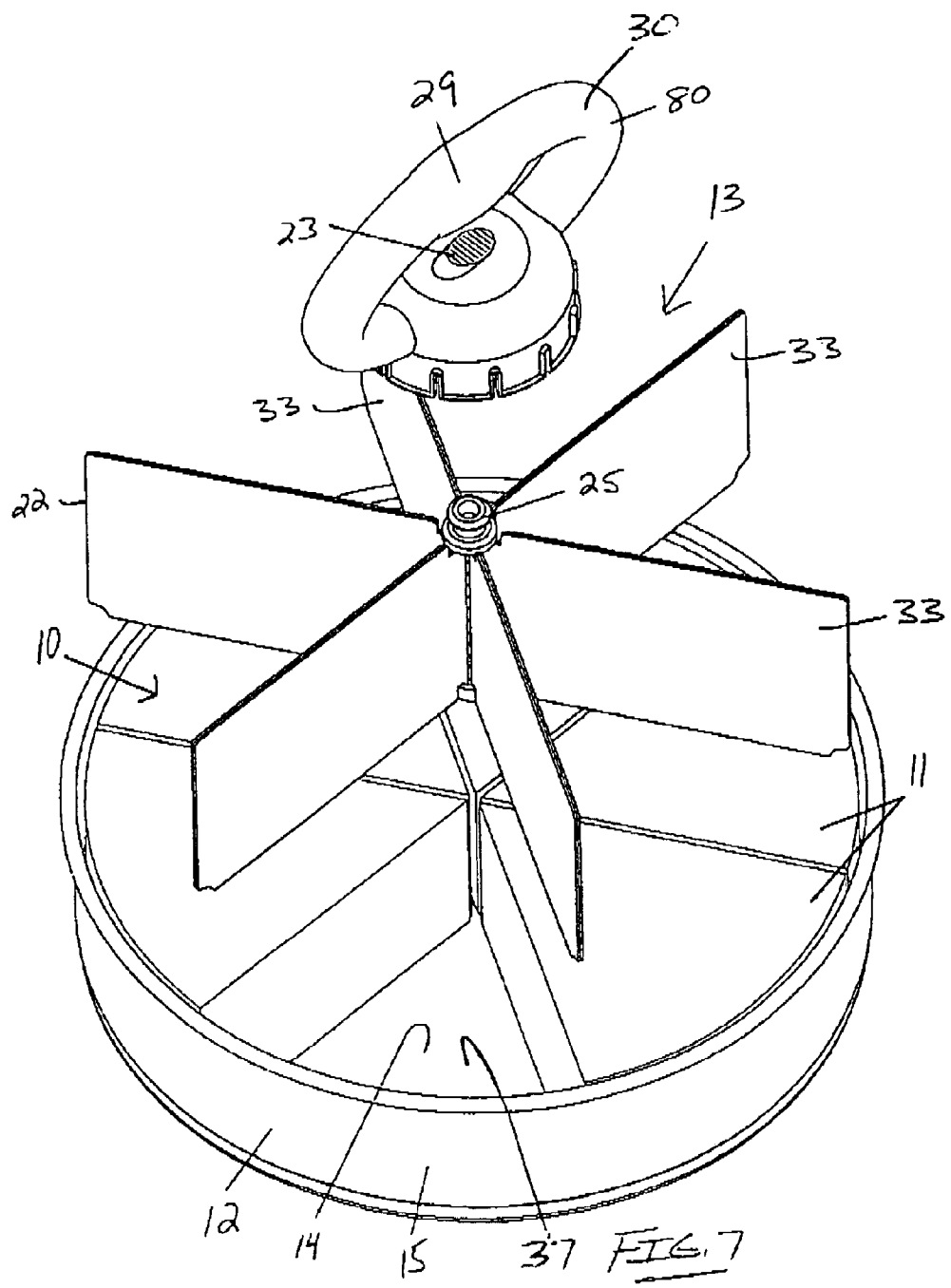

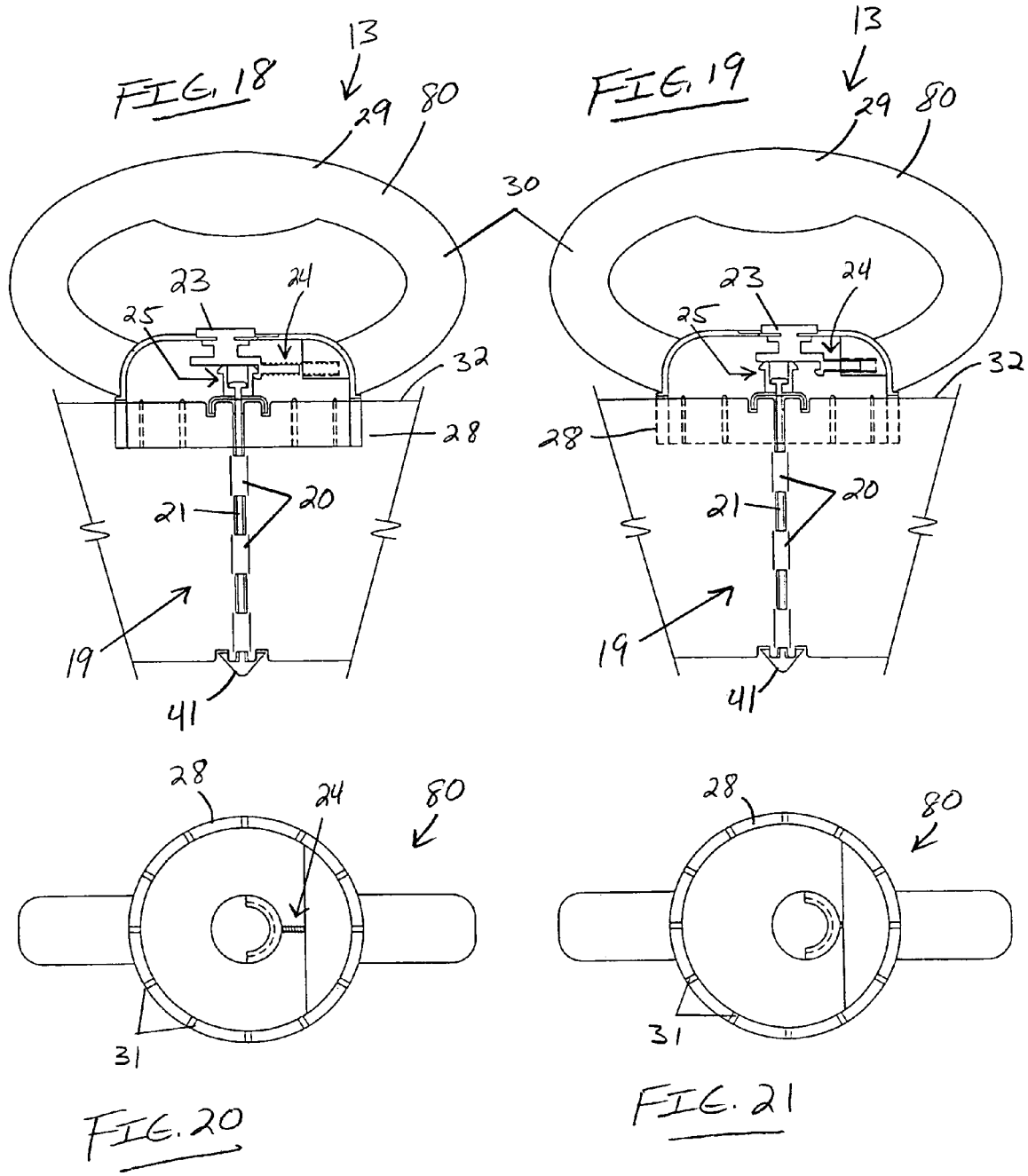

FOOD PRESENTATION SYSTEM AND ASSEMBLY THEREFOR

PRIOR HISTORY

This application is a continuation-in-part patent application claiming priority to U.S. patent application Ser. No. 10/459,821, filed in the United States Patent and Trademark Office on Jun. 11, 2003 now abandoned.

BACKGROUND OF THE INVENTION

1. Field of the Invention

The claimed invention generally relates to an assembly for sectioning a food preparation. More specifically, the claimed invention relates to a blade assembly for enabling users thereof to section and display food preparations as form-prepared in food preparation containers and the like.

2. Description of the Prior Art

It is common practice to bake food items such as brownies, cakes, and cookies as one continuous sheet in food preparation containers of standard sizes such as 9 inches by 13 inches and 8 inches by 8 inches, or any number or circular food preparation containers having variously sized diameters. The baked or otherwise prepared food item is then commonly sliced into a plurality of smaller food items such as bars, squares, or wedge-shaped pieces for removal from the baking pan or food preparation container. The task of slicing the food preparation into bars, squares, or wedge-shaped pieces is commonly performed by using a knife or other similar instrument having a single cutting blade that is customarily used to make several individual longitudinal and lateral sectioning cuts defining the sides of each of the bars, squares, or wedge-shaped pieces.

The task of slicing the food preparation into a number of smaller food sections with a single bladed knife requires overcoming several challenges in order to achieve a desirable end result. One of the challenges that must be overcome is ensuring that the sectioning cuts are made straight. Freehandedly cutting a straight line in a sheet of brownies, for example, using a single bladed knife without reference to a straight edge such as the upright side of the food preparation container is often difficult to accomplish. Another challenge that must be overcome is ensuring that the sectioning cuts are made completely through the food item. If close attention is not paid to the depth of the cut made by the knife, the individual bars, squares, or wedge-shaped pieces will often not be completely separated. An even further challenge that must be overcome is ensuring that the food sections are sized appropriately. It is commonly desired to evenly section the food item so that all of the food sections are of the same size. However, it is difficult to achieve substantially equally sized and shaped food sections when freehandedly cutting the food preparation with a single blade knife.

There are several different types of cutting apparatuses in the prior art that use multiple cutting blades to cut food items into smaller sections. Some of these prior art devices are disclosed here in the form of previously issued United States Patents. However, these previously issued United States Patents do not disclose or teach a device that addresses the previously mentioned problems concerning cutting a sheet of brownies or similar type food item into a plurality of smaller portions within a food preparation container having upright sides.

U.S. Pat. No. 1,175,512 ('512 Patent), which issued to Flemal, discloses a Scraper. The '512 Patent teaches a scraper comprising a plurality of assembling bars, a plurality of scraping blades arranged transversely of and interlocked with the assembling bars, a plate provided with depending flanges adapted to interlock with certain of the assembling bars, a hand grasp operatively connected to the plate, and clamping members coacting with the plate and certain of the assembling bars for maintaining the plate in applied position.

U.S. Pat. No. 1,754,541 ('541 Patent), which issued to Benoit, discloses an Egg Case Filler. The '541 Patent teaches a filler structure having cross walls. One of the cross walls is edge-notched to interlock with the other wall, which other wall comprises a D-slot through which the first wall is extended. The edges defining the D-slot present a bowed portion, the ends of which are shouldered and extended past a connecting straight portion to accommodate the notched wall when bowed without catching upon the notches in the edges thereof and to support the notched wall when straightened between the straight and shouldered portions which lie upon opposite sides of the wall.

U.S. Pat. No. 2,118,211 ('211 Patent), which issued to Lutz, discloses a Liquid Congealing Apparatus. The '211 Patent teaches a removable grid for dividing an ice tray into a plurality of cells for forming ice cubes comprising a single strip of flexible metal bent to form a plurality of vertical transverse walls of double thicknesses of metal, a plurality of vertical longitudinal walls formed of a single thickness of metal connecting adjacent thicknesses of the transverse walls, and a plurality of vertical longitudinal wall members extending between the transverse walls and each comprising two thicknesses of metal bent from the transverse walls and folded adjacent a contiguous transverse wall.

U.S. Pat. No. 4,000,845 ('845 Patent), which issued to Zeller, discloses a Partition Assembly and Partition Strips Therefor. The '845 Patent teaches a partition assembly having interlocking longitudinal and transverse partition strips to form compartments or cells for the reception of bottles, cans or other containers. The strips have sections that form the walls of the cells and are defined by spaced slots in each strip extending from one edge and a substantial depth into the strip and relatively shallow notches in the opposite edge of the strip in alignment with said slots. A set of sections, including the section at one end of each strip, has tabular projections near one edge extending into the slots in one direction, and a section at the opposite end of the strip has a tabular projection extending into a slot but in the opposite direction, the slots of the longitudinal strips interfitting with the slots of the transverse strips with the tabs of one interlocking in notches of the other forming a partition assembly.

U.S. Pat. No. 4,648,300 ('300 Patent), which issued to Hassenfelt, discloses a Biscuit Cutting Apparatus. The '300 Patent teaches a square frame surrounding and extending upwardly from a planar cutting surface to define a dough compartment. A plurality of vertical slots in each side wall extends from the top edge thereof down to the cutting surface to provide a guide for a cutting blade inserted therein. The slots are arranged in such a pattern that three, four, or six equal width slices may be formed in each direction depending on the slots selected for use. The cutter blade is accurately shaped along the bottom from end to end to ensure good contact with the cutting surface. An enlarged end portion at each end of the cutting blade prevents inadvertent dislodgement of the cutting blade during usage. A flour trough is provided on one side wall to facilitate the maintenance of a floured cutting blade during usage.

U.S. Pat. No. 5,074,777 ('777 Patent), which issued to Gamer, discloses an Apparatus for Making a Split Pie. The '777 Patent teaches a pie dividing assembly adapted to be inserted into a conventional circular pie pan once it is covered with a bottom sheet or layer of pie dough for separating the pie into a plurality of separate and distinct pie sections, preferably two, each adapted to receive a different and distinct pie filling therein before an optional top layer or cover of pie dough is placed thereover and the pie baked. Normally, after the pie is at least partially baked, approximately ⅔ baked, to where the pie filling has set, the pie divider is removed and the pie allowed to bake until done at which time the fully baked single unitary pie will have a plurality of sections each having a different and distinct pie filling therein. In the preferred embodiment of the present invention, the pie divider separates the pie into two equally dimensioned halves but embodiments are provided for separating the pie into three, four, six, eight, etc. dimensionally equal or unequal sections, as desired. The invention also contemplates a split-filling pie made as a product by process, and a method of making a split-filling pie. Another embodiment is provided for dividing a pizza into a plurality of different and distinct slices before the topping or combination of toppings is added.

U.S. Pat. No. 5,343,623 ('623 Patent), which issued to Cole, discloses a Knife Assembly for Cutting a Food Product. The '623 Patent teaches a knife blade and knife blade assembly for cutting food products into sticks or slices without causing surface cracking. The knife blade has a cutting portion defining a cutting edge and is mounted in the knife assembly such that a tension force is exerted on the knife blade in the plane of the cutting edge. The cutting edge of the knife blade is not sharp, but is generally flat and extends between parallel sides of the knife blade. The individual knife blades are formed of stainless steel and are electro-polished to remove any surface defects or sharp edges which may produce stress concentrations. This enables a significant tension force to be applied to the knife blade without diminishing its useful life. The electro-polishing process may also round off the corners of the juncture between the flat cutting edge and the parallel knife blade sides.

U.S. Pat. No. 5,579,582 ('582 Patent), which issued to Carlson, discloses a Puzzle Cookie Cutter. The '582 Paten teaches a puzzle cookie cutter comprising a cutting die holder and at least one cutting die removably securable in the holder. The die or dies provide for the cutting of cookie dough, batter, or the like into several separate, irregularly shaped and sized interfitting pieces, which pieces may be reassembled as a puzzle after baking to provide entertainment for the consumer of the cookie. The dies may be provided in virtually any regular or irregular geometric shape, animal or other caricature or representation, and/or any alphanumeric character, as desired. The die or dies may also provide for the spaced apart separation of the cut dough or batter, to allow for expansion or flow of the batter or dough during the baking process, in order that the baked pieces will have a close fit with one another without interference. The cut pieces may be baked adjacent one another on a sheet or pan and decorated after the baking process as desired, then separated randomly to provide a challenge akin to that of the assembly of a relatively simple jigsaw or picture puzzle, in addition to the enjoyment of eating the baked cookie pieces.

U.S. Pat. No. 5,597,113 ('113 Patent), which issued to Bradford, discloses a Recyclable Container Partition. The '113 Paten teaches a collapsible partition assembly comprising a set of parallel longitudinal dividers and a set of parallel transverse dividers intersecting at a plurality of intersections. Each of the longitudinal dividers has a series of evenly spaced slots which extend downwardly from a top edge of the longitudinal divider to approximately the middle of the longitudinal divider. Each transverse divider has a series of evenly spaced slots, each slot extending upwardly from a bottom edge of the transverse divider to approximately the middle of the transverse divider. The slots of the longitudinal and transverse dividers engage with one another at the intersections. Dividers are secured to each other at each intersection by a securement bead which extends from a point proximate the top edge of the intersection to proximate the bottom edge of the intersection. The intersecting dividers create four angles. The securement bead runs along one angle and permits the partition assembly to be collapsed and recycled.

U.S. Pat. No. 5,848,470 ('470 Patent), which issued to Anderson, discloses an Impact Actuated Baker Grid Device. The '470 Patent teaches an impact actuated bakery grid device for producing uniform portions of baked goods wherein the grid device includes a force generating unit operatively associated with a handle assembly member which is connected at widely spaced locations on a grid member for forcibly ejecting the portions of baked goods from within the confines of a plurality of compartments within the grid member.

U.S. Pat. No. 6,276,918 ('918 Patent), which issued to Slaughter et al., discloses a Dough Cutting Apparatus. The '918 Patent teaches a dough cutting apparatus comprising a plurality of spaced apart blades the lower edges of which are uniformly curved from one end of said blades to the other and a plurality of intersecting spaced apart blades the lower edges of which are straight. The blades cooperate to form multiple uniformly sized cavities therebetween. A handle assembly is attached to the blades for engagement by the user of the apparatus for rocking the apparatus along the lower edges of the curved blades to separate a layer of dough into separate multiple dough products.

These previously issued United States Patents do not disclose or teach a food-cutting or sectioning device that is used to section a food item or preparation within a food preparation container into a plurality of uniformly sized and shaped smaller portions. Therefore, there is a need for a device that can uniformly and simultaneously section a food item or preparation within a container such as a food preparation container for displaying the food preparation in smaller portions. There is a further need for a device of this type that is easily stored during periods of time when the device is not in use. Therefore, there is a need for a blade assembly which is expandable for sectioning and displaying a food preparation in smaller food sections, and which assembly is collapsible into a folded form for ease of storage.

SUMMARY OF THE INVENTION

To provide an answer for these needs, as well as other that will become apparent after reading this specification and viewing the appended drawings, the claimed invention provides a blade assembly usable in combination with a food preparation container to section and display a container-borne, form-prepared food preparation into a plurality of smaller food portions. It is an object of the claimed invention to provide a blade assembly capable of making straight sectioning cuts. It is a further object of the claimed invention to provide a blade assembly capable of making sectioning cuts of uniform depth. It is an even further object of the claimed invention to provide a blade assembly capable of sectioning an entire food item within a baking pan into a plurality of uniformly shaped smaller sections. Still further, it is an object of the claimed invention to provide a blade assembly having a plurality of opposingly oriented blades that are collapsible into a compact configuration for storage.

To achieve these and other readily apparent objectives, the invention summary comprises a foldable blade assembly for sectioning an entire food item, such as brownies, cakes, pies, cookies, lasagna, pizza, gelatin, etc. within a food preparation container or baking pan into a plurality of equally sized smaller sections. The blade assembly of the present invention generally comprises a plurality of radiating cutting blades, including at least one laterally orientable cutting blade and at least one longitudinally orientable cutting blade, a central hinge structure connecting the cutting blades, and a removable handle assembly structure.

The radiating cutting blades are sized and shaped to section an entire food item diameter within a food preparation container or baking pan into a plurality of sectioned smaller portions. The cutting blades may optionally comprise angled end portions, which portions are angled to compensate for the angularity of upright walls of certain food preparation containers when the blade assembly is pressed into a food item within the food preparation container. Each of the cutting blades are hingedly attached to the central hinge structure thereby providing pivotal freedom of movement between the cutting blades.

The handle assembly is shaped for applying manual force perpendicular to the cutting blades during use. The handle assembly has blade-receiving structure for receiving the upper edges of the cutting blades. The handle assembly may thus be removably connected to the blades so that the blade assembly may be more easily folded into a closed position to reduce space required storage space of the blade assembly. The handle assembly has a push button that can be manually depressed to release the handle assembly from the cutting blades.

BRIEF DESCRIPTION OF THE DRAWINGS

Other features of our invention will become more evident from a consideration of the following brief description of patent drawings:

FIG. 3 is a perspective view of the food preparation and blade assembly shown in FIG. 1 showing the sectioned food sections with one food section and the food preparation container removed.

FIG. 3(a) is a fragmentary side view depiction of a food bottom and food wall of a first food preparation.

FIG. 6 is a perspective view of the first preferred embodiment of the blade assembly of the present invention showing a second blade orientation sectioning and displaying a food preparation in a plurality of food sections borne by a food preparation container with one food section removed.

FIG. 6(a) is a fragmentary side view depiction of a container bottom and container wall of a first food preparation container.

FIG. 7 is an exploded perspective view of the blade assembly shown in FIG. 6 juxtaposed in superior adjacency to the food preparation and food preparation container depicting the sectioned food sections with one food section removed.

FIG. 18 is a fragmentary side view depiction of the force-imparting handle assembly of the present invention with certain parts broken away to show a button assembly thereof in a spring-relaxed, blade-retaining position.

FIG. 19 is a fragmentary side view depiction of the force-imparting handle assembly of the present invention with certain parts broken away to show the button assembly in a spring-actuated, blade-releasing position.

FIG. 20 is a fragmentary bottom plan view type depiction of the force-imparting handle assembly showing certain button assembly components in the spring-relaxed, blade-retaining position.

FIG. 21 is a fragmentary bottom plan view type depiction of the force-imparting handle assembly showing certain button assembly components in the spring-actuated, blade-releasing position.

DETAILED DESCRIPTION OF THE PREFERRED EMBODIMENT(S)

Figure 1:
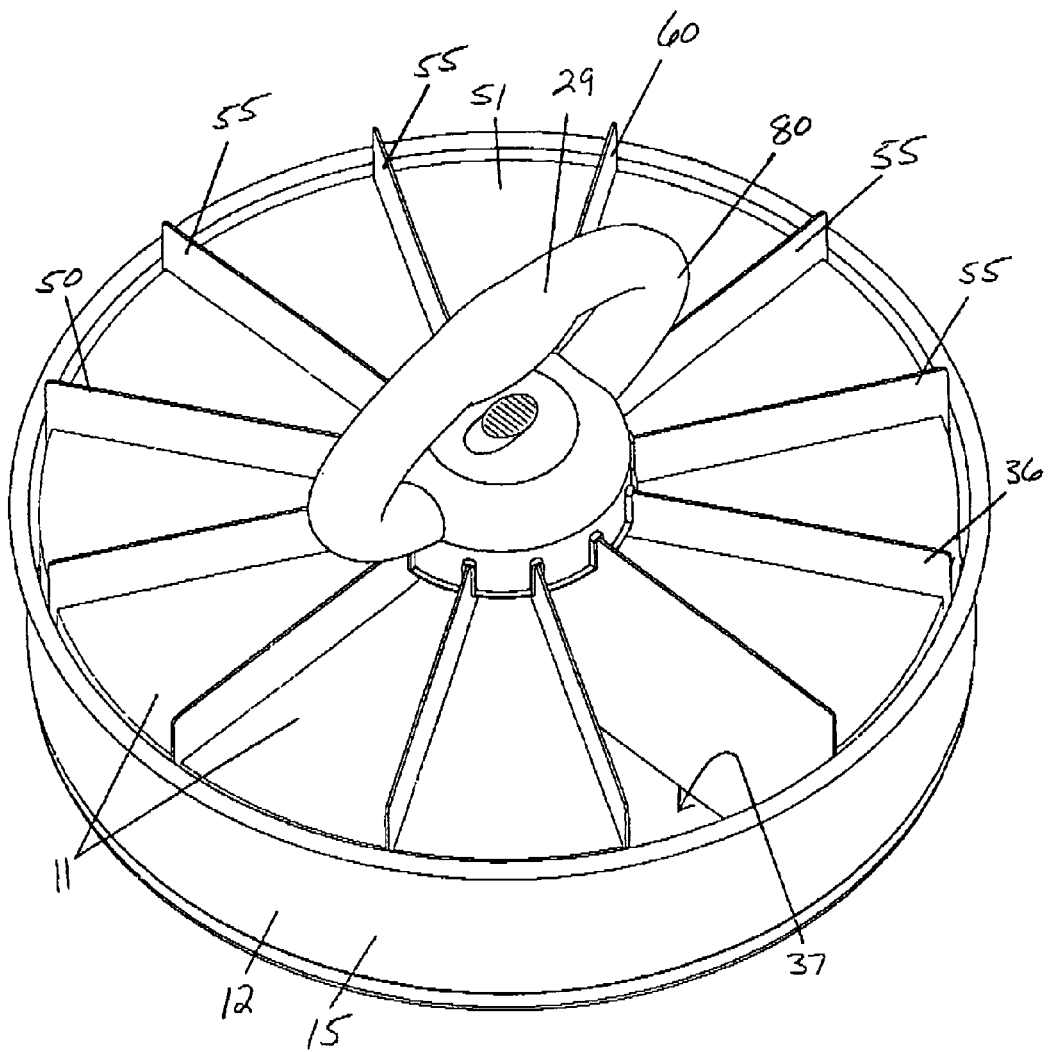
FIG. 1 is a perspective view of a first preferred embodiment of the blade assembly of the present invention showing a first blade orientation sectioning and displaying a food preparation in a plurality of food sections borne by a food preparation container with one food section removed.

Referring now to the drawings, the preferred embodiment of the present invention generally concerns a food-presentation system for sectioning and displaying a container-prepared food preparation in(to) a plurality of food sections. The container-prepared food preparation 10 is generally depicted and referenced in FIGS. 2, 4, 5, 7-9, 11, 13, and 14; and the food sections 11 are generally depicted and referenced in FIGS. 1-14. It is contemplated that the food-presentation system of the present invention preferably comprises, in combination, a food preparation container 12 as illustrated and referenced in FIGS. 1, 2, 4-11, 13, and 14; the container-prepared food preparation 10 ; and a blade assembly 13 as illustrated and referenced in FIGS. 1-3, 6, 7, 10-12, 18, 19, 22, 23, and 25.

It may be understood from an inspection of FIGS. 6-11, 13, and 14 that the food preparation container 12 preferably comprises a circular, substantially planar container bottom 14; and a peripheral container wall 15 as depicted and referenced in FIGS. 1, 2, 4-9, 13, and 14. The container wall 15 is preferably integrally formed to the container bottom 14 and extends upwardly therefrom. Notably, the container wall 15 may either extend upwardly (vertically) as generally depicted in FIG. 6(a) or upwardly and outwardly from the container bottom 14 at a certain container angle of inclination, the container angle of inclination 16 preferably being substantially equal to or greater than 90 degrees as generally and comparatively depicted in FIGS. 6(a) versus 13(a).

The food preparation 10 is essentially a (container) form-prepared food item and thus may be described as form-prepared in the food preparation container 12. The food preparation 10 thereby preferably comprises a substantially planar food bottom 53 as depicted and referenced in FIGS. 3(a) and 12(a); a peripheral food wall 52 as illustrated and referenced in FIG. 3; a superior food surface 51 as referenced in FIGS. 1, 3-6, 8, 9, and 11-14; and a blade-sliceable bulk food portion, the bulk food portion being bound by the food bottom, food wall 52, and food surface 51. Notably, while preferably substantially planar, superior exposed food portions as form-prepared are not always planar. Food surface 51 may thus be somewhat irregular in form or non-planar. In any event, the bulk food portion has a maximal bulk thickness, which extends intermediate the food bottom and food surface.

It should be readily understood that the food wall 52 preferably extends upwardly or upwardly and outwardly from the food bottom 52 at a food angle of inclination 17, the food angle of inclination 17 preferably being equal in magnitude to the container angle of inclination 16 as generally and comparatively depicted in FIGS. 3(a) (showing food angle of inclination 17) versus 6(a) (showing container angle of inclination 16); and 12(a) (showing food angle of inclination 17) versus 13(a) (showing container angle of inclination 16).

The blade assembly 13 preferably comprises a substantially planar, laterally orientable cutting blade 50 as illustrated and referenced in FIGS. 1-3, 22, and 25; and a substantially planar, longitudinally orientable cutting blade 60 as illustrated and referenced in FIGS. 1-3, 22, and 25; and a force-imparting handle assembly 80 as illustrated and referenced in FIGS. 1-3, 6, 7, 10-12, and 16-25.

Figure 15:
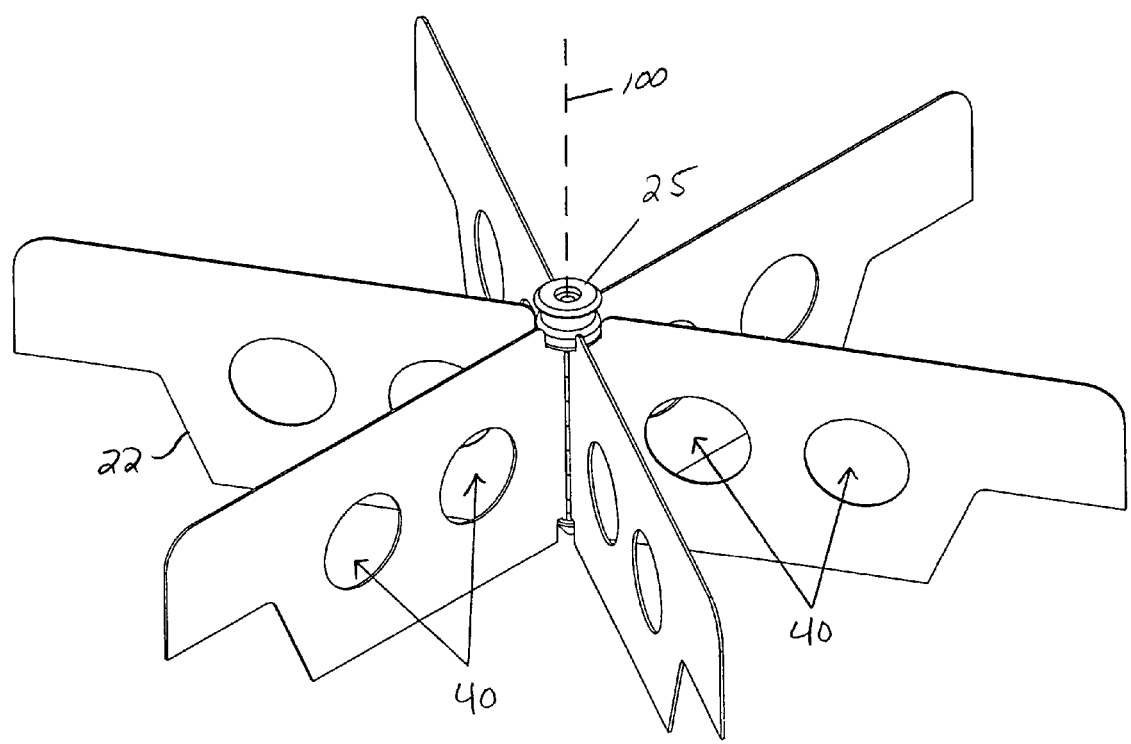
FIG. 15 is a perspective view of alternative radiating cutting blades of the blade assembly of the present invention.
Figure 16:
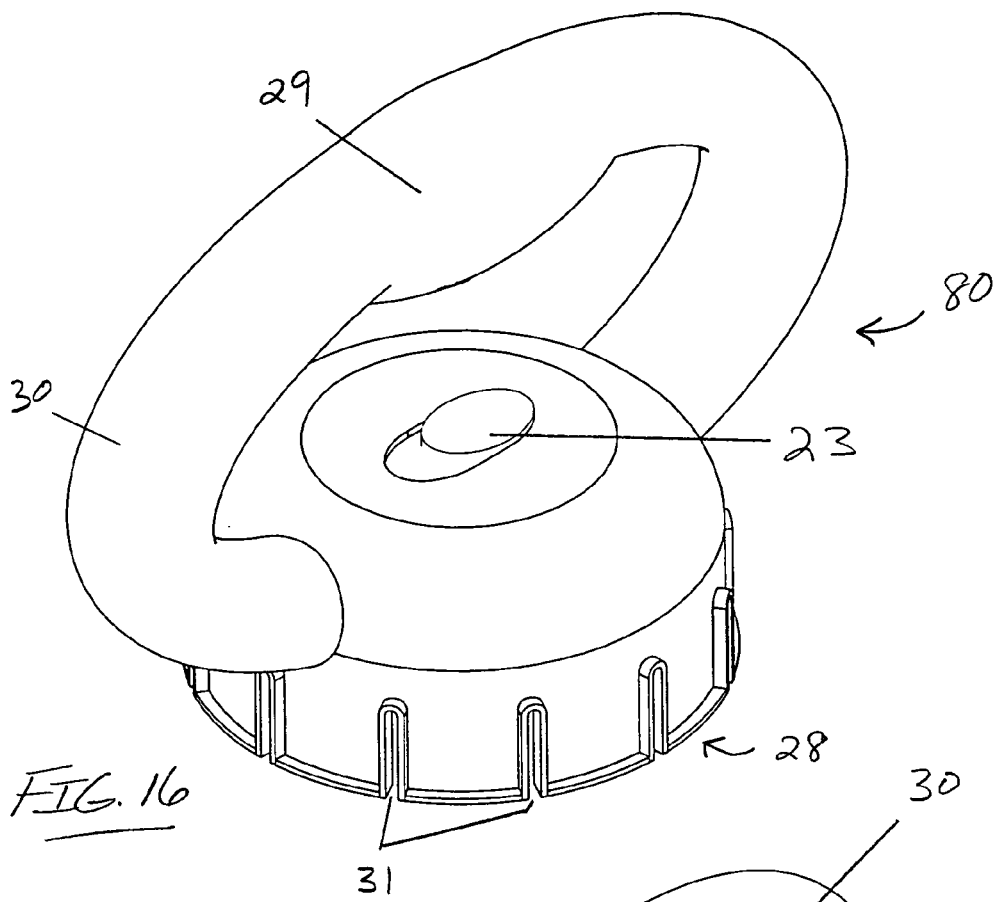
FIG. 16 is a top perspective view of a force-imparting handle assembly of the blade assembly of the present invention.
Figure 17:
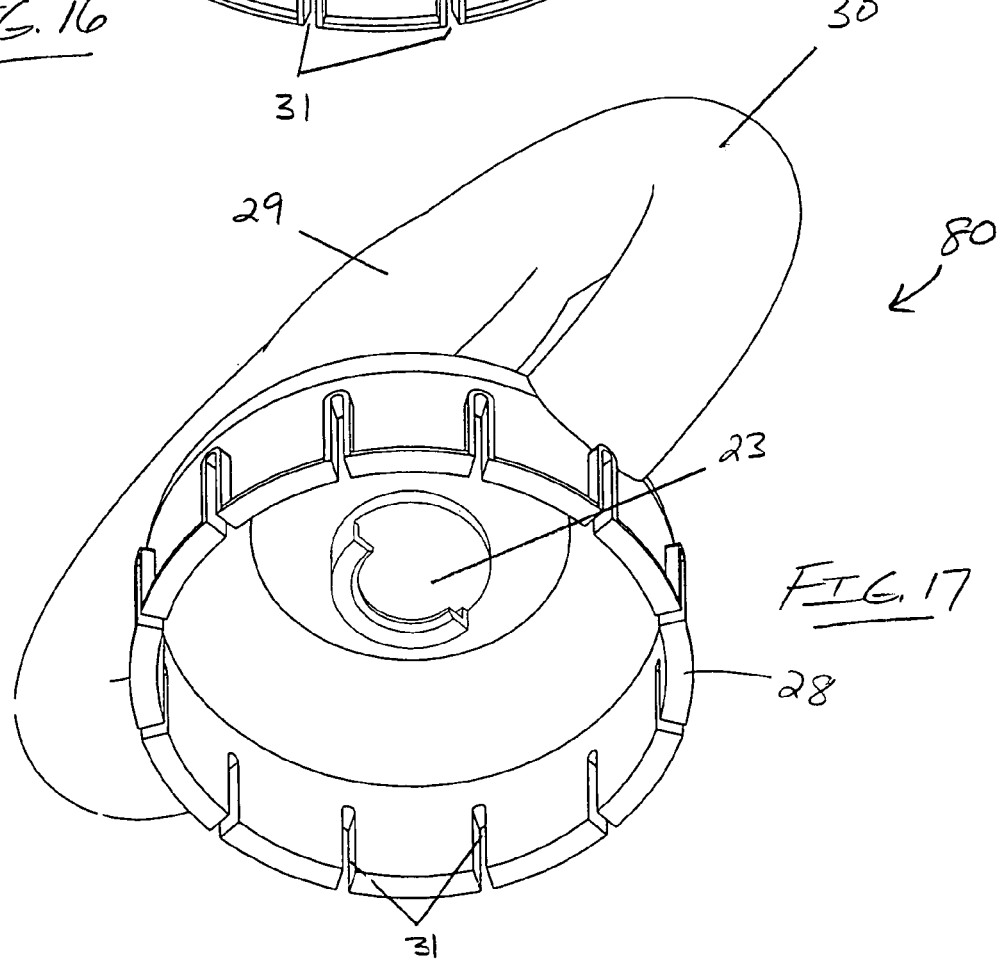
FIG. 17 is a bottom perspective view of the force-imparting handle assembly shown in FIG. 16.
Figure 22:
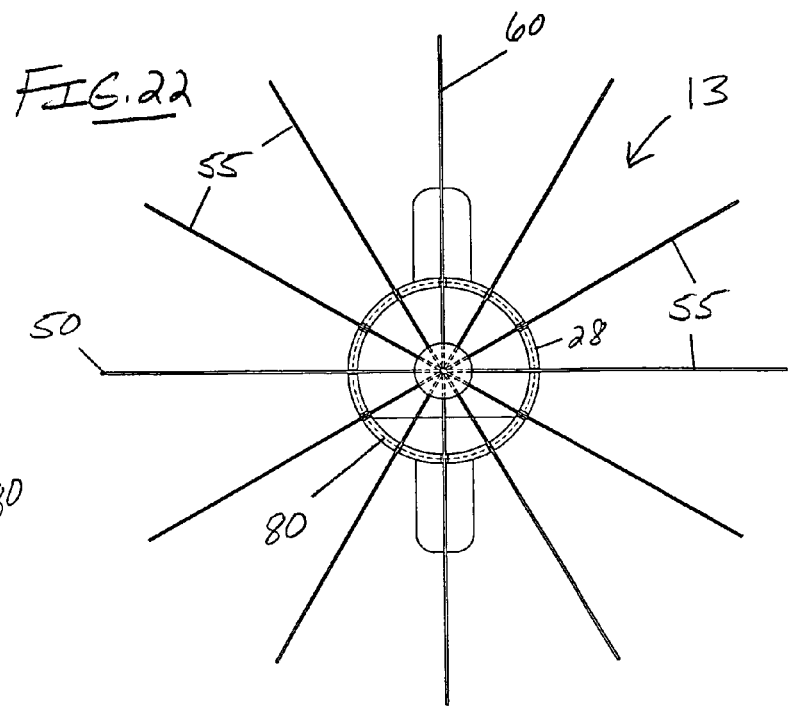
FIG. 22 is a bottom plan view type depiction of the blade assembly of the present invention in a first, 12-piece blade orientation.
Figure 24:
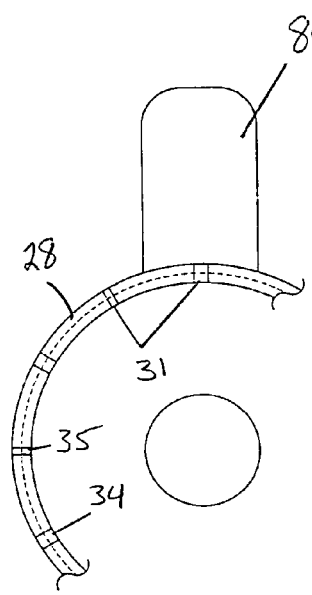
FIG. 24 is a fragmentary bottom view of the force-imparting handle assembly of the blade assembly with certain parts broken away and showing blade-receiving notches having varied widths.
Figure 26:
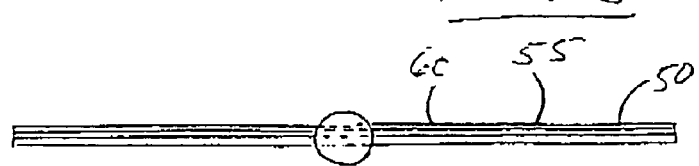
FIG. 26 is a bottom plan view type depiction of the blade assembly of the present invention in a fully collapsed, cutting blade orientation.

In addition to the lateral and longitudinal cutting blades 50 and 60, blade assembly 13 preferably comprises a number of other cutting blades 55, all of which are laterally or longitudinally orientable, and all of which may be pivotally varied about a common central hinge structure so that the blades radiate uniformly therefrom as generally depicted in FIGS. 1-3, and 22. In other words the cutting blades 50, 55, and 60 are hingedly joined so that they may pivot about a axis of rotation 100 (as generally referenced in FIG. 15) for enabling a user to vary blade angles, the variable blade angles extending intermediate the cutting blades 50, 55, and 60 and variable intermediate 0° and 180° for collapsing blade assembly 13 for storage as generally depicted in FIG. 26 (shown with handle assembly 80 removed) and re-expanding or reopening the blade assembly 13 for cutting as generally and comparatively depicted in FIG. 22 (showing the blade assembly 13 in a in a fully expanded-cutting state).

It is contemplated that a piano type hinge connection 19 as referenced in FIGS. 18 and 19 may well function to pivotally connect the cutting blades 50, 55, and 60. The piano type hinge connection 19 may be preferably defined by pin-receiving structure(s) 20 and a pin 21 receivable in the pin-receiving structure(s) 20 as further illustrated and referenced in FIGS. 18 and 19. The piano type hinge connection 19 may thus effectively function to hingedly connect the cutting blades 50, 55, and 60, thereby providing certain means for pivotally changing the relationship between the cutting blades from the expanded food-sectioning arrangement generally depicted in FIG. 22 (depicting a first expanded blade orientation) and FIG. 23 (depicting a second expanded blade orientation) to a collapsed blade state or arrangement for storage as generally depicted in FIG. 26.

Figure 2:
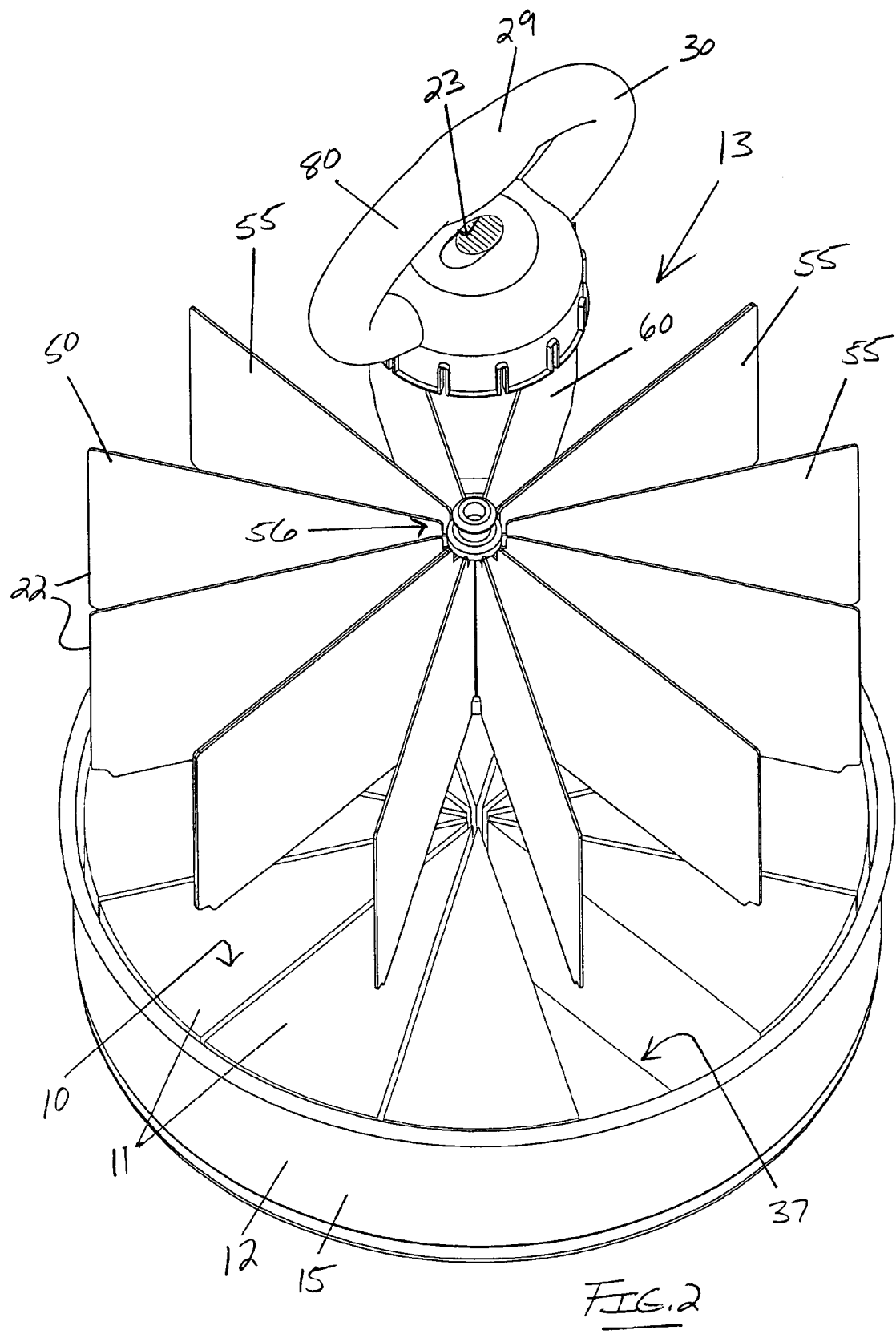
FIG. 2 is an exploded perspective view of the blade assembly shown in FIG. 1 juxtaposed in superior adjacency to the food preparation and food preparation container depicting the sectioned food sections with one food section removed.
Figure 4:
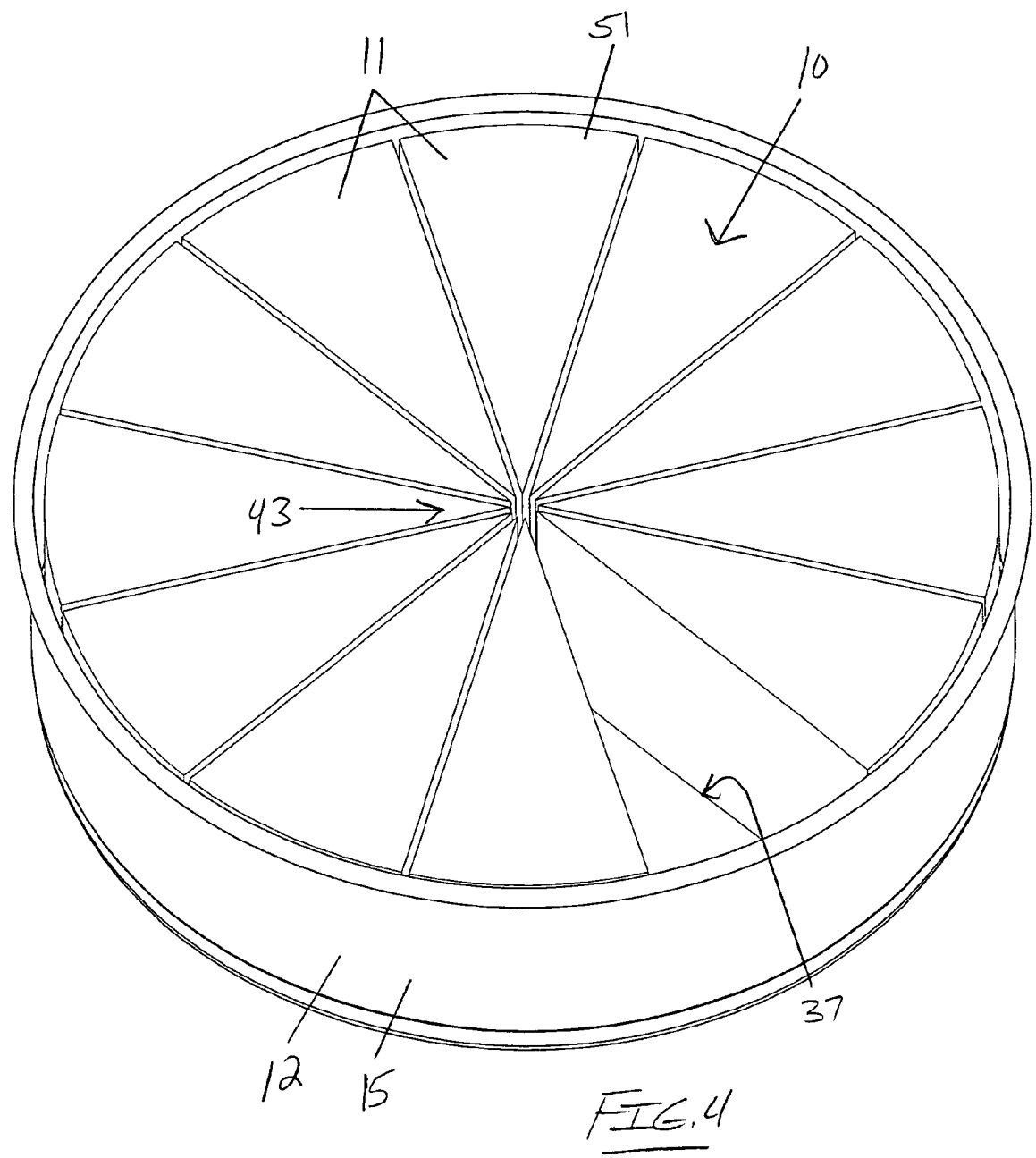
FIG. 4 is a perspective view of the sectioned food preparation and food preparation container shown in FIG. 1 showing one food section and the blade assembly removed.
Figure 9:
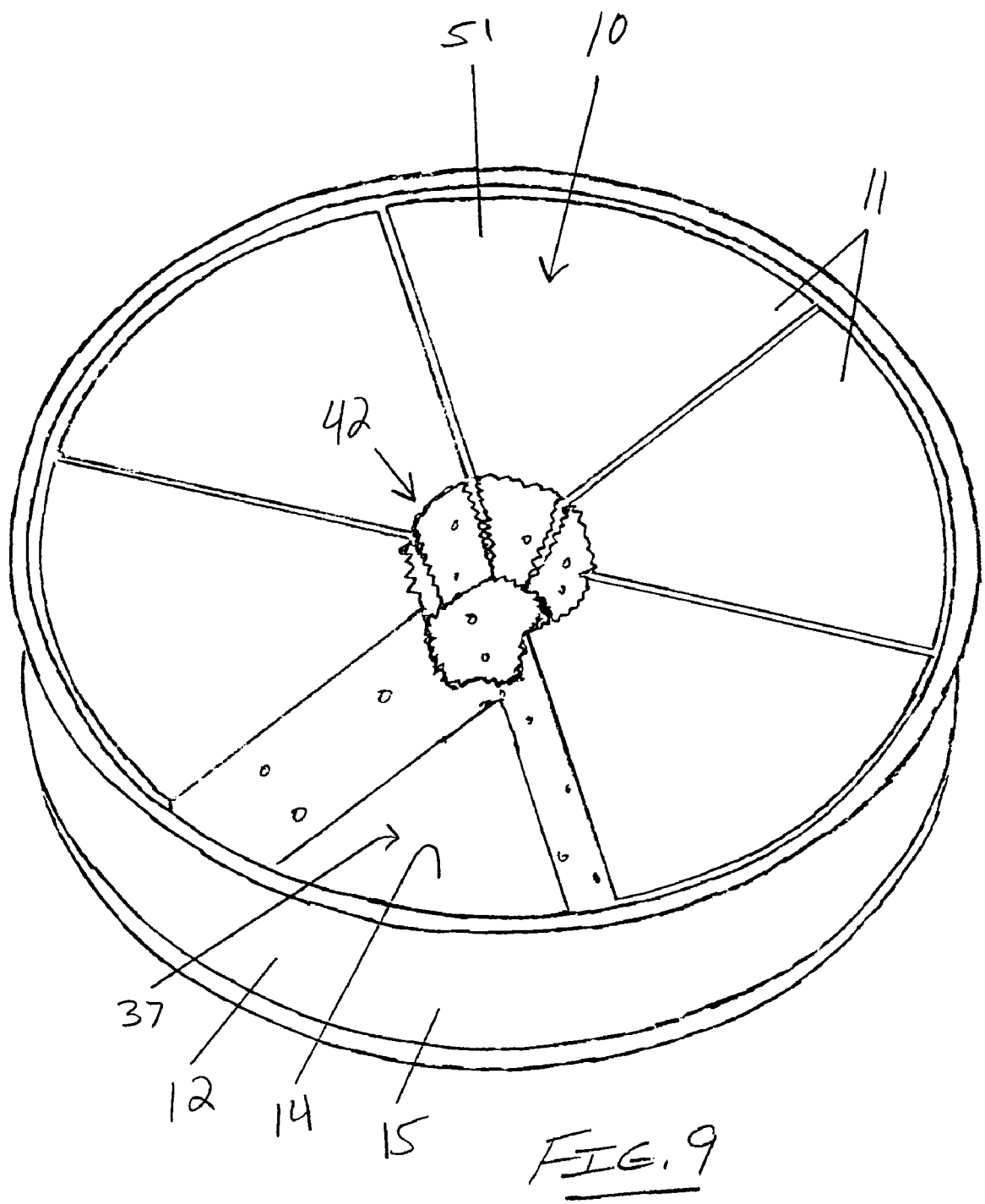
FIG. 9 is a perspective view of a sectioned food preparation showing the sectioned food sections with one food section removed and depicting bulk food portions smashed in the region where the blade junction otherwise operates to section the food preparation.
Figure 10:
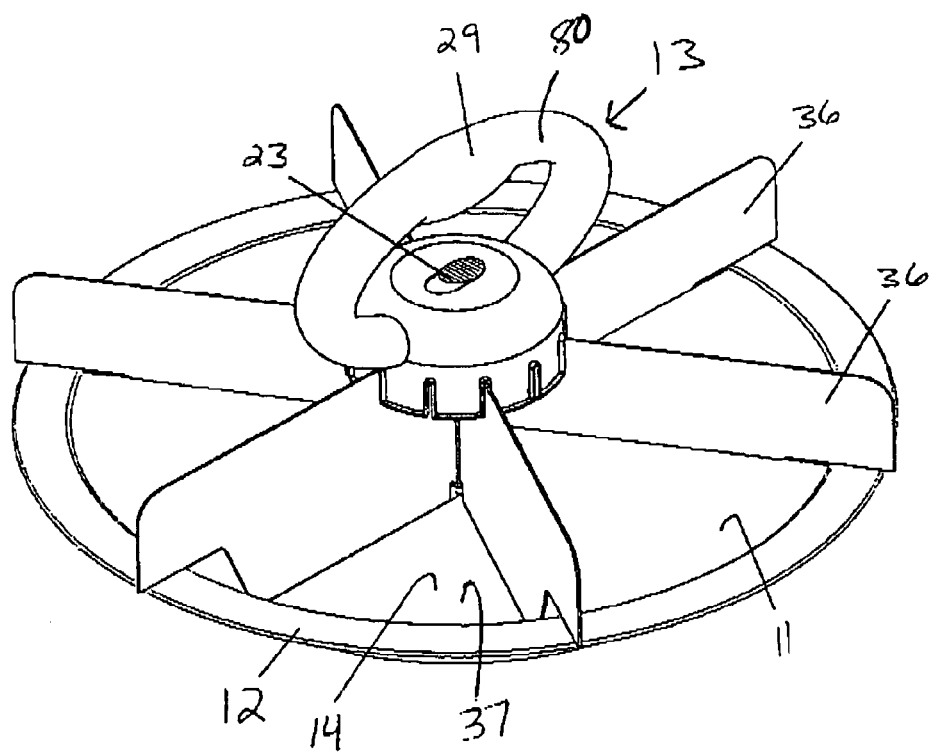
FIG. 10 is a perspective view of a second preferred embodiment of the blade assembly of the present invention showing a first blade orientation sectioning and displaying a food preparation in a plurality of food sections borne by a food preparation container with one food section removed.
Figure 11:
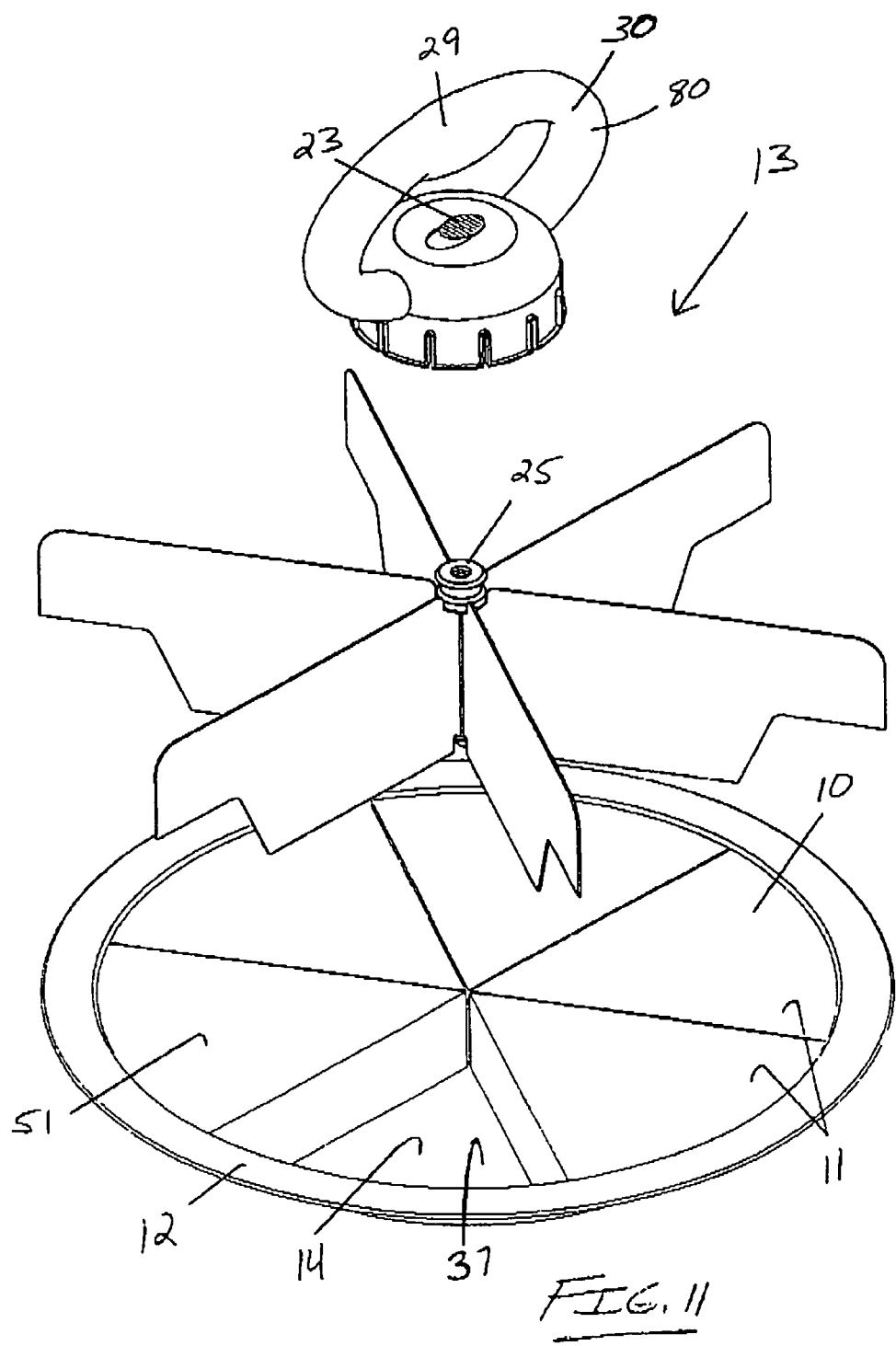
FIG. 11 is an exploded perspective view of the blade assembly shown in FIG. 10 juxtaposed in superior adjacency to the food preparation and food preparation container depicting the sectioned food sections with one food section removed.

Further, the cutting blades 50, 55, and 60 each preferably comprise a blade depth greater in magnitude than the maximal bulk thickness for exposing a superior blade junction 56 in superior adjacency to the food-surface 51, which blade junction 56 is generally referenced in FIG. 2. In inferior relation to the superior blade junction 56, it is contemplated that the blade assembly 13 may optionally comprise certain pointed structure 41 as illustrated and referenced in FIGS. 18 and 19. In other words, it is contemplated that each pin 21 may preferably comprise a pointed tip or pointed structure 41 at the inferior end thereof. In this regard, it should be noted that it has been found when blade junctions attempt to section through a food item or food preparation 10, oftentimes the food item region in radial adjacency to the junction becomes smashed as generally depicted in FIG. 9 at reference numeral 42.

Since a primary purpose of the present invention is to cleanly section and neatly display sectioned food preparations, unsightly smashed regions at blade junctions are not preferred. To remedy the defect, it has been found that pointed structure 41 functions to provide a cleaner sectioning function which results in a neater food preparation display as diagrammatically depicted (for comparative purposes) in FIGS. 4 and 8 at reference numeral 43. Thus, it is contemplated that the blade junction preferably comprises an inferior junction end, the inferior junction end comprising pointed structure 41 for piercing the bulk food portion at the blade junction and for preventing bulk food portion compaction as at 42 when the food preparation 10 is sectioned into a plurality of food sections 11. Each cutting blade 50, 55, and 60 is designed to vertically section the food preparation 10 from the food surface 51 to the food bottom 52 intermediate the bulk food portions in a radiating manner from the central hinge structure or axis 100. The blades 50, 55, and 60 may either comprise vertical or angled ends 22 as illustrated and referenced in FIGS. 2, 7, and 15 to completely cut through the food bulk.

The force-imparting handle assembly 80 of the present invention may be manually (i.e. via the user's hand) removable, as may be achieved by certain push-button structure 23 or certain handle assembly-release means that can be depressed to release the handle assembly 80 from the cutting blades 50, 55, and 60, which push-button structure 23 is illustrated and referenced in FIGS. 2, 7, 10, and 16-19. From an inspection of FIGS. 18 and 19, it will be seen that push-button structure 23 is cooperably associated with certain spring-actuating means 24 as referenced in FIGS. 18-20 and certain button-retaining means 25 as depicted and referenced in FIGS. 7, 11, 15, 18, and 19. When in a relaxed spring state as generally depicted in FIG. 18, push-button structure 23 engages the button-retaining means 25 cooperatively associated with superior blade junction 56 for retaining force-imparting handle assembly 80 thereto. When manually depressed into an actuated spring state as generally depicted in FIGS. 19 and 21, the push-button structure 23 disengages the button-retaining means 25 for selectively releasing the handle assembly 80 therefrom. Thus, it will be understood that certain handle assembly-release means may well function to be uni-finger operable for selective push-button release of the force-imparting handle assembly 80 from the blade assembly 13.

It is contemplated, in any event, that the force-imparting handle assembly 80 or is removable from blades 50, 55, and 60 for the purpose of minimizing storage bulk of the blade assembly 13. The force-imparting handle assembly 80 preferably comprises a blade-engaging end 28 as depicted and referenced in FIGS. 16-25; a hand-engaging end 29 as depicted and referenced in FIGS. 1-3, 6, 7, 10-12, 16-19, and 25; and certain rigid handle assembly structure 30 as generally depicted and referenced in FIGS. 2, 7, 11, and 16-19 for enabling effective force transfer from the handle assembly 80 to the cutting blades 50, 55, and 60. In this regard, it will be seen that the rigid handle assembly structure 30 extends intermediate the blade-engaging end 28 and the hand-engaging end 29. The blade-engaging end 28 preferably comprises blade-receiving structure such as a series of radially-aligned, blade-receiving notches 31 or grooves as generally depicted and referenced in FIGS. 16, 17, 20, 21, and 24. Further, from an inspection of the noted figures, it will be seen that the hand-engaging end 29 preferably comprises a hand-grip portion. The blade-receiving notches 31 removably receive the superior blade ends 32.

Figure 23:
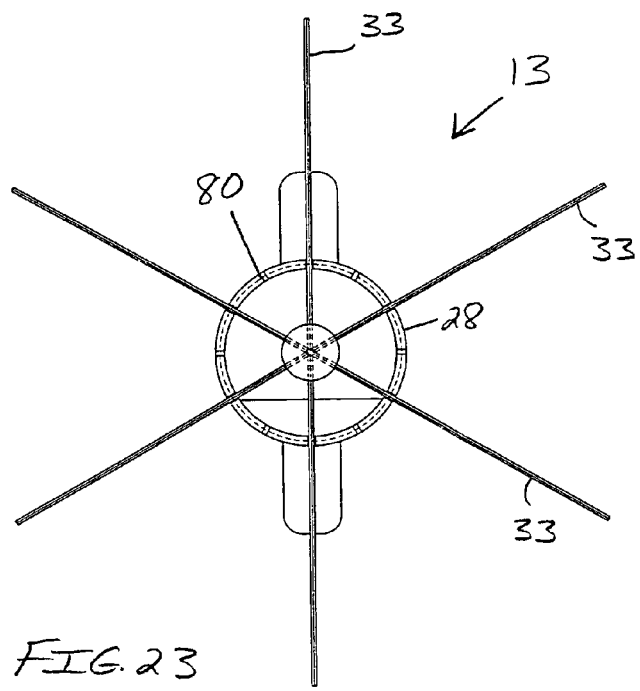
FIG. 23 is a bottom plan view type depiction of the blade assembly of the present invention in a second, 6-piece blade orientation.

The blade-receiving notches or grooves 31 preferably comprise a groove width, the groove widths being sized and shaped for selectively receiving paired, stackable cutting blades 33, which blades 33 are depicted and referenced in FIGS. 7 and 23. From an inspection of FIG. 24, it will be seen that blade-receiving notches 31 are variously dimensioned (alternative wide notches 34 versus narrow notches 35). The wide notches 34 may well function to receive blades 33 as generally shown in FIG. 23. The force-imparting handle assembly 80 of the present invention and the stackable cutting blades 33 of the present invention thus enable a user to selectively form a select number of equally-sized food sections. In this regard, it will be recalled that blades 50, 55, and 60 may take on various arrangements (limited by fixing structural receipt at the notches 31) For example, FIGS. 1-3 depict a first cutting blade orientation without sandwiched cutting blades 33 and FIGS. 6 and 7 depict a second cutting blade orientation with sandwiched cutting blades 33. As shown, it is contemplated that the select number of food sections 11 may thus be being selected from the group consisting of six food sections (as shown in FIGS. 6 and 7) versus twelve food sections (as shown in FIGS. 1-3).

The hand grip portion or hand-engaging end 29 together with the rigid handle structure 30 enable a user to manually impart vertically directed forces to the blade assembly 13. Thereby, the food preparation 10 may be effectively sectioned into a plurality of food sections 11 via the downwardly directed cutting blades 50, 55, and 60. The downwardly directed cutting blades 50, 55, and 60 prevent adjacent food sections from contacting one another as generally depicted in FIGS. 1, 3, 6, 10, and 12. The food-presentation system of the present invention thus functions to section a container-prepared food preparation 10 in(to) a plurality of food sections 11.

In terms of displaying the container-prepared food preparation 10, it is contemplated that the food presentation system of the present invention may well function to display the otherwise sectioned food preparation 10 to potential consumers. In this regard, the reader is directed to FIGS. 1, 3, 4, 6, 8, 10, 12, and 13, all of which attempt to illustrate how the food preparation 10 may be displayed for potential consumers after sectioning the same into food sections 11. In this regard, it should be noted that blade assembly 13 may well function to corral the food sections 11. In other words, the downwardly directed cutting blades 50, 55, and 60 thereby provide planar barriers 36 between the corralled food sections 11 and matter external to the corralled food sections 11 as depicted and referenced in FIGS. 1, 3, 6, 10, and 12.

Figure 12:
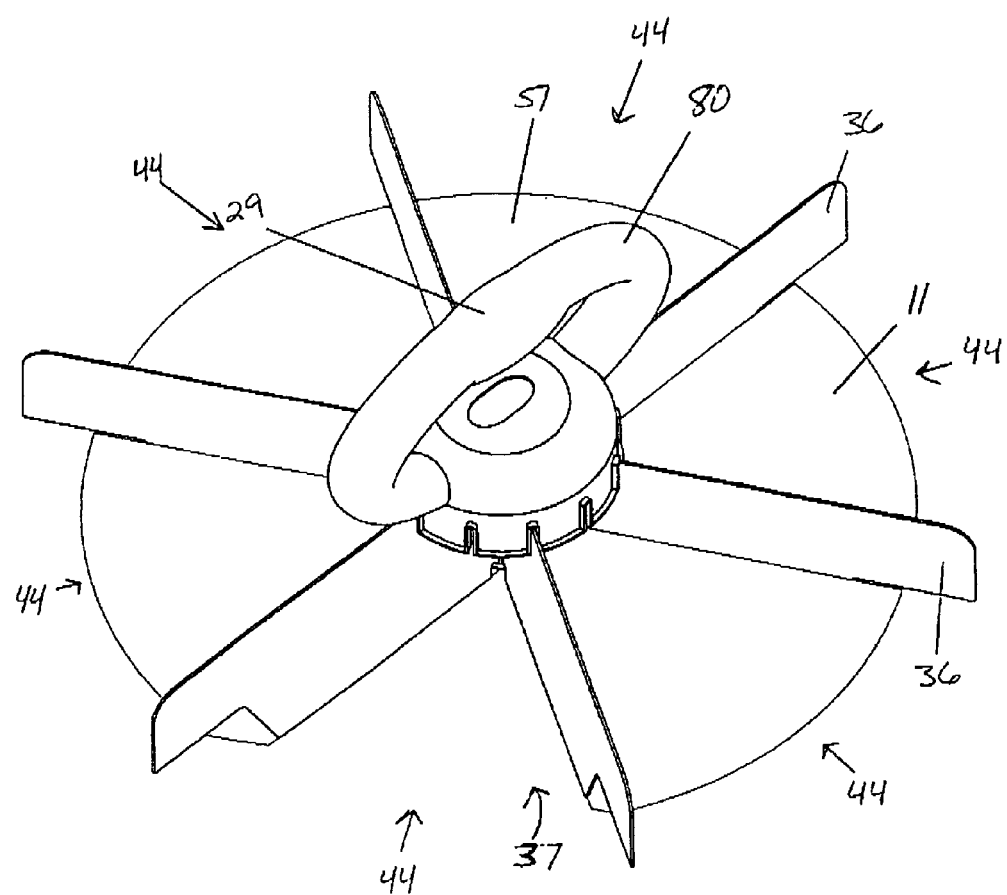
FIG. 12 is a perspective view of the food preparation and blade assembly shown in FIG. 10 showing the sectioned food sections with one food section and the food preparation container removed.
Figure 12A:
FIG. 12(a) is a fragmentary side view depiction of a food bottom and food wall of a second food preparation.
Figures 13, 13A:
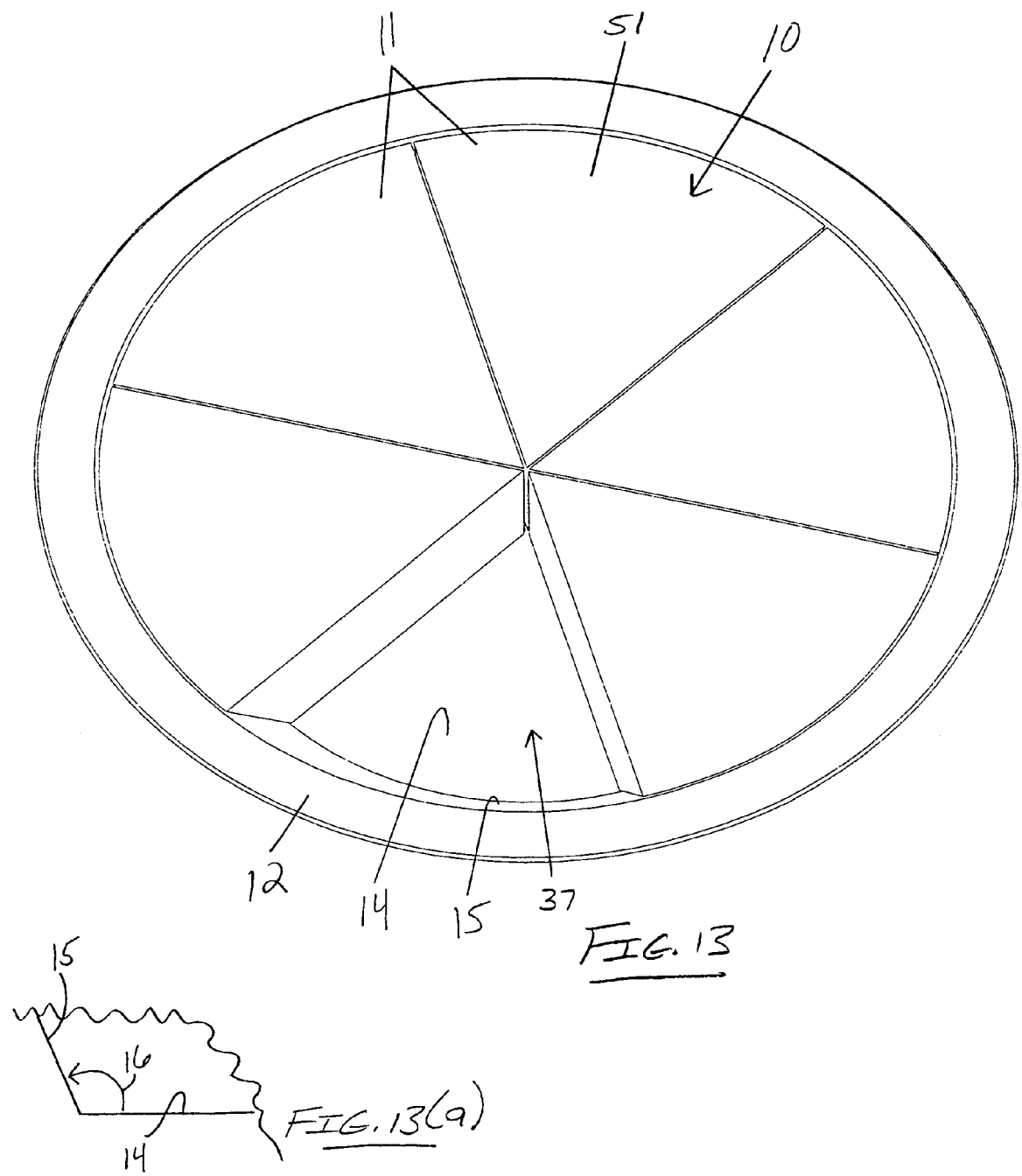
FIG. 13 is a perspective view of the sectioned food preparation and food preparation container shown in FIG. 10 showing one food section and the blade assembly removed.
FIG. 13(a) is a fragmentary side view depiction of a container bottom and container wall of a second food preparation container.

Further, it is contemplated that the food preparation 10 and the blade assembly 13 are preferably cooperably removable from the food preparation container 12, or alternatively, that the food preparation container 12 is removable from the food preparation 10 and the blade assembly 13 as generally depicted in FIGS. 3 and 12. It will be seen from an inspection of FIGS. 3 and 12, for example, that the blade assembly 13 (with container 12 removed) thereby enables provision of certain food service stations 44 for enhancing food section 11 removal from the blade assembly 13. In other words, food item or section consumers may obtain certain food sections 11 by removing same in a direction perpendicular to the sectioning movement of handle assembly 80 from those regions where container 12 would otherwise be retaining the food section walls 52. Notably, each food section 11 may preferably comprise at least two vertical, substantially planar adjacent section walls, and an arcuately angled outer section wall.

Figure 5:
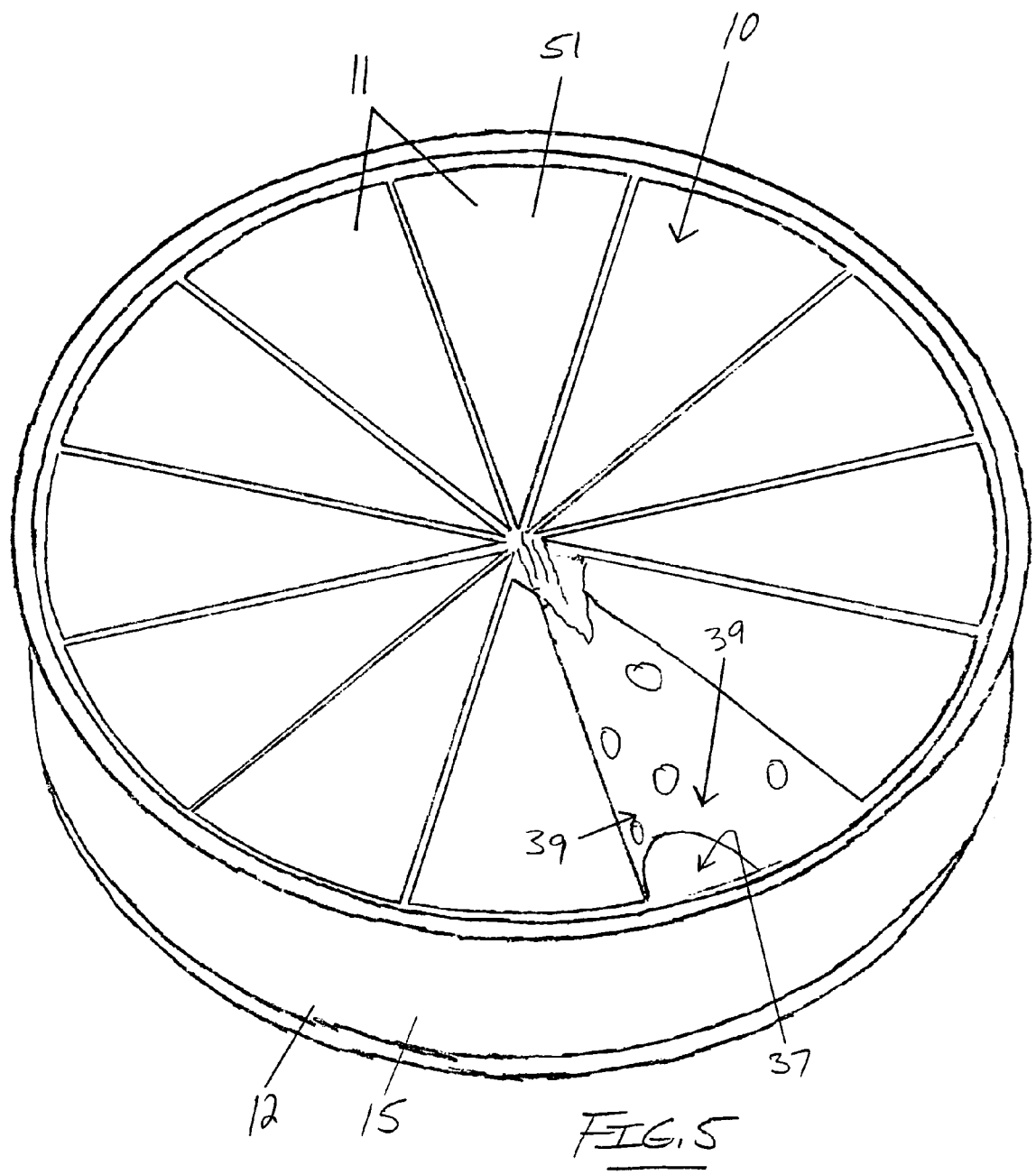
FIG. 5 is a perspective view of a sectioned food preparation and food preparation container with one food section removed and depicting bulk food portions entering the food section vacancy.
Figure 8:
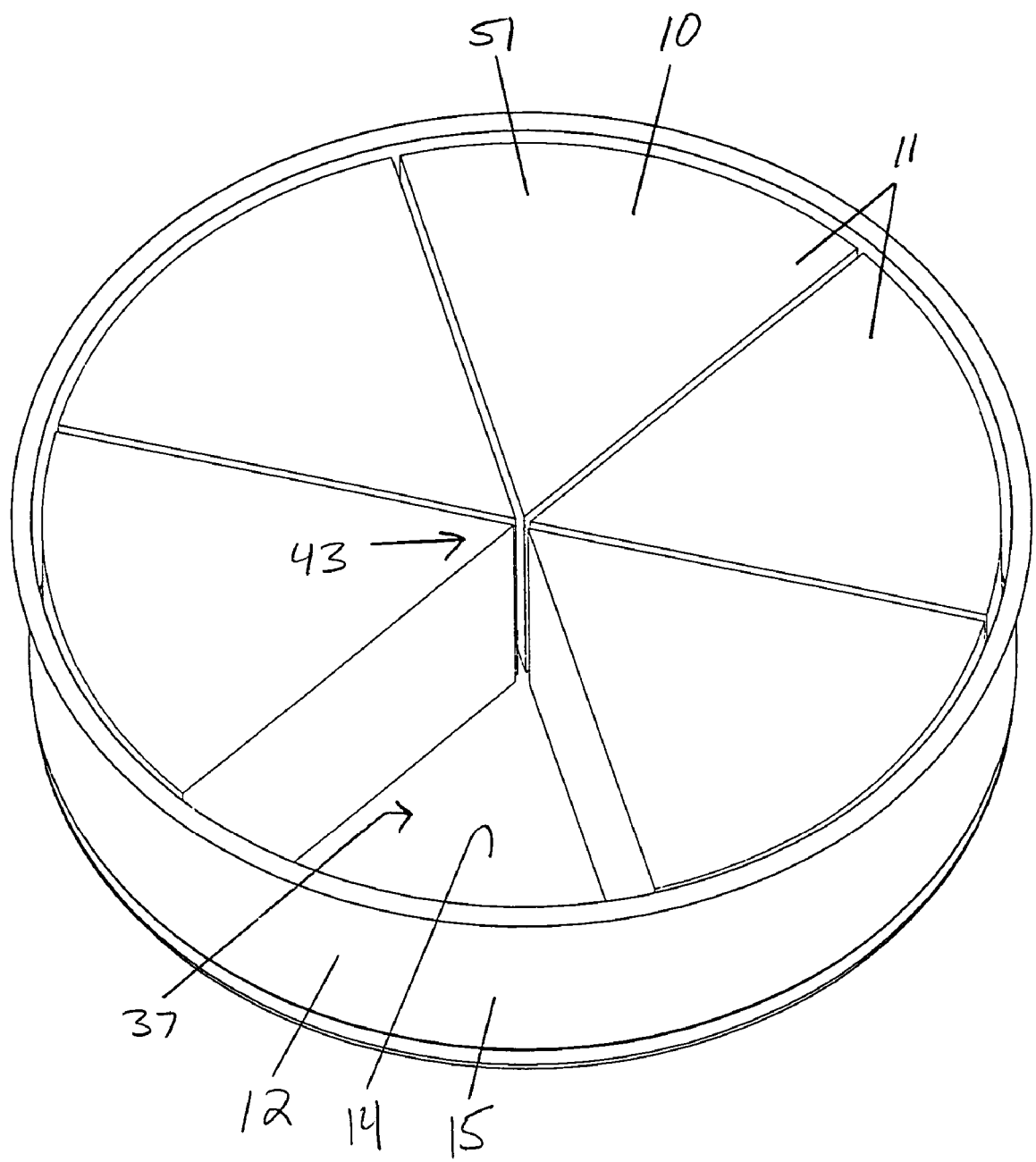
FIG. 8 is a perspective view of the sectioned food preparation and food preparation container shown in FIG. 6 showing one food section and the blade assembly removed.
Figure 14:
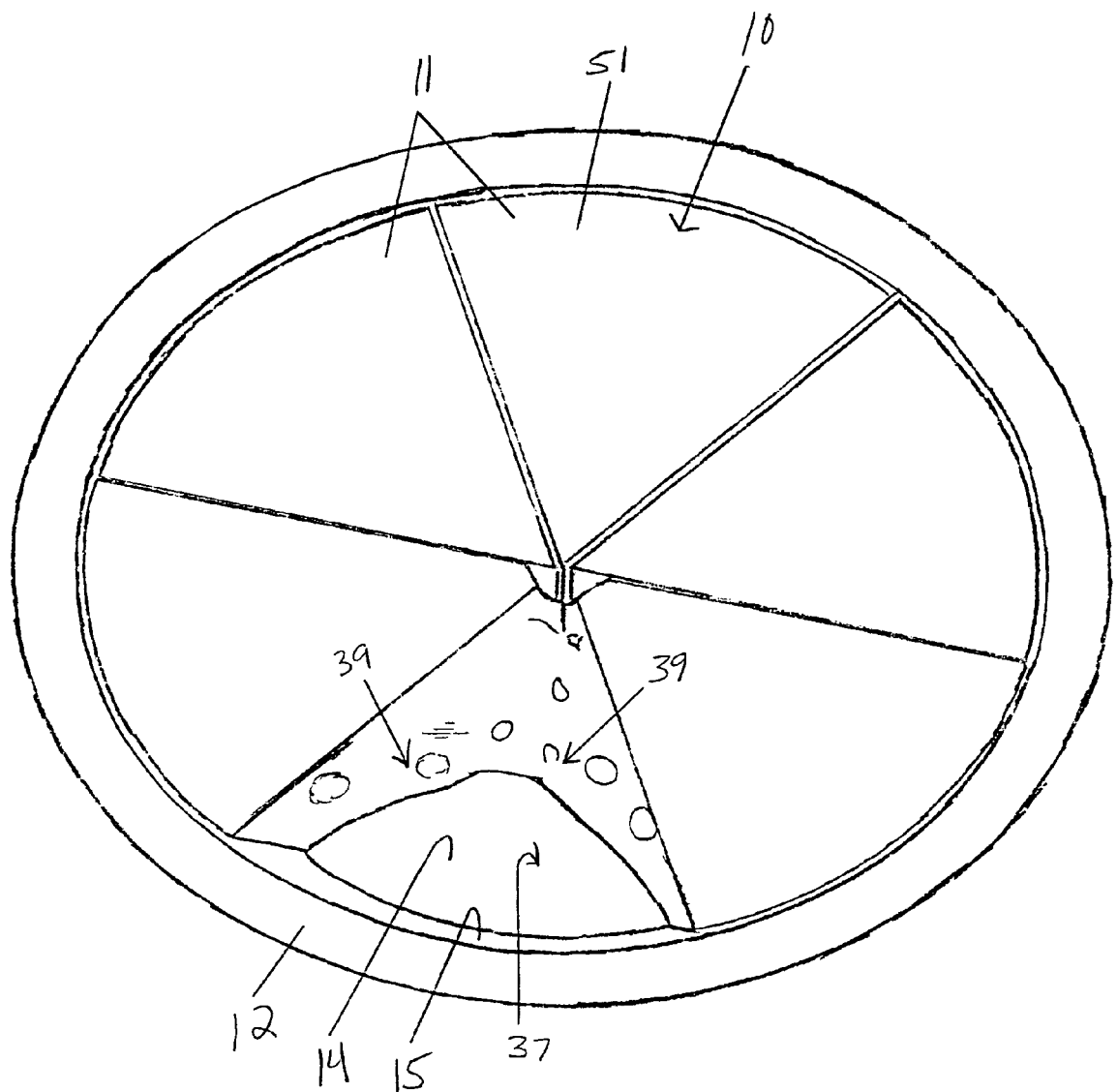
FIG. 14 is a perspective view of a sectioned food preparation and food preparation container with one food section removed and depicting bulk food portions entering the food section vacancy.

It will be further seen from an inspection of the noted figures that at least one select food section is removable from the food preparation container 12 for creating a section vacancy 37 as generally depicted in FIGS. 1-14. The planar barrier(s) 36 may well function to prevent the container-borne bulk food portions 38 from otherwise entering (as at 39) the section vacancy(ies) 37 as is generally depicted in FIGS. 5 and 14, and further prevent matter from contacting the food section 11 otherwise protected by the barriers 36, as for example, to prevent the food section from drying (i.e. moisture-retention or air-contact prevention) out at its outermost bulk food portion. In this last regard, it is contemplated that the blades 50, 55, and 60 may preferably comprise ornamental blade surfaces 45 or other ornamentation for providing at least one ornamentally-bound section vacancy as generally depicted in FIG. 6.

In this last regard, it is contemplated that the blades 50, 55, and 60 may be preferably constructed from stainless steel or similar other material having a highly reflective, polished surface for effecting a certain degree of ornamentation adjacent the section vacancy. Further, it is contemplated that the cutting blades 50, 55, and 60 may optionally comprise blade apertures 40 as illustrated and referenced in FIG. 15. It is contemplated that the optional blade apertures 40 may well function not only to provide a certain degree of ornamentation, but also provide the manufacturer with reduced material(s) cost. Further, certain food items may benefit from exposure to adjacent materials as enabled via the blade apertures 40. For example, with certain baked goods, the blade apertures function to prevent sticking of the blade as it sections the food item. It is thus contemplated that the blade apertures 40 extend intermediate the opposing ornamental surfaces for facilitating food preparation sectioning and for providing at least one apertured, ornamentally-bound section vacancy 37. Further, it is contemplated that the food presentation system of the present invention may well function to section the container-borne food preparation 10 and effectively display a substantial portion thereof.

Figure 25:
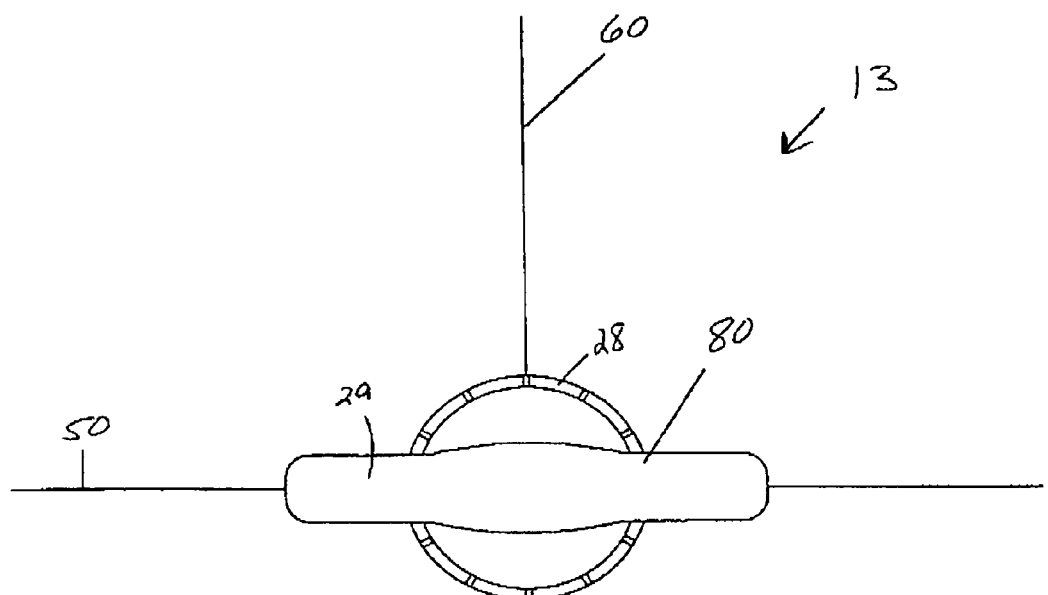
FIG. 25 is a top plan view depiction of a preferred blade assembly of the present invention.

While the above description contains much specificity, this specificity should not be construed as limitations on the scope of the invention, but rather as an exemplification of the invention. For example, the invention may be said to essentially disclose a blade assembly for sectioning and displaying a food preparation as prepared in a food preparation container. The blade assembly of the present invention may be said to essentially comprise at least one substantially planar, laterally orientable cutting blade, at least one substantially planar, longitudinally orientable cutting blade, and at least one force-imparting handle assembly as generally depicted in FIG. 25. The cutting blades may comprise opposing ornamental blade surfaces and may be hingedly joined for enabling a user to selectively vary blade angles extending intermediate the cutting blades.

The cutting blades each function to vertically section a food preparation from its food surface to the food bottom intermediate the bulk food portions. The force-imparting handle assembly comprises a blade-engaging end, a hand-engaging end, and rigid handle assembly structure extending intermediate the blade-engaging end and the hand-engaging end. The blade-engaging end comprises certain blade attachment means and the hand-engaging end may comprise a hand-grip portion. The blade attachment means removably attach the handle assembly to the cutting blades.

The hand grip portion and the rigid handle assembly structure enabling a user to manually impart vertically directed forces to the blade assembly. The food preparation may be thereby sectioned into a plurality of food sections via the downwardly directed cutting blades. The cutting blades further function to corral the resulting food sections, and provide planar barriers between the corralled food sections and matter external to the corralled food sections. Notably, at least one select food section is removable from the food preparation container for creating a section vacancy. In this regard, it is noted that the planar barriers may further function to prevent the container-borne bulk food portions from entering the section vacancy. Further, the ornamental blade surfaces may function to provide at least one ornamentally-bound section vacancy. Thus, it is contemplated that the blade assembly of the present invention enables a food presentation system for sectioning a container-borne food preparation and uniquely displaying a substantial portion thereof.

Further, the foundational elements of the invention may thus be said to teach or disclose a foldable food cutter for sectioning an entire food item within a food preparation container into a plurality of equally sized smaller sections, the cutter comprising at least one laterally orientable cutting blade, at least one longitudinally orientable cutting blade, and at least one (removable) handle assembly. The cutting blades are hingedly connected to provide pivotal freedom of movement between the cutting blades. The handle assembly is shaped for providing manual force perpendicular to the cutting blades during use.

Stated another way, the foldable cutter of the present invention may be said to section an entire food item within a food preparation container into a plurality of equally smaller sections. To achieve this function, the cutter comprises radially arranged cutting blades sized and shaped to fit within a food preparation container having an upright side. The cutting blades may thus section an entire food item within the food preparation container into a plurality of smaller sections. A hinge connection hingedly connects the cutting blades providing means for pivotally changing the relationship between the cutting blades from an expanded radial arrangement to a substantially coplanar arrangement. Further, the handle assembly enables provision of manual force perpendicular to the cutting blades during use.

Accordingly, although the invention has been described by reference to a number of preferred and alternative embodiments, it is not intended that the novel system, device or assembly be limited thereby, but that modifications thereof are intended to be included as falling within the broad scope and spirit of the foregoing disclosure, the following claims and the appended drawings.

We claim:

1. A food-presentation system, the food-presentation system for radially sectioning and displaying a container-prepared food preparation in a plurality of food sections, the food-presentation system comprising, in combination:

a food preparation container, the food preparation container comprising a circular container bottom and a peripheral container wall, the container wall being integrally formed to the container bottom extending upwardly therefrom and comprising a container angle of inclination relative to the container bottom;

a container-borne food preparation, the food preparation being form-prepared in the food preparation container, the food preparation comprising a food bottom, a peripheral food wall, a superior food surface, and a blade-sliceable bulk food portion, the bulk food portion being bound by the food bottom, food wall, and food surface, the food wall extending upwardly and outwardly from the food bottom at a food angle of inclination, the food angle of inclination being equal in magnitude to the container angle of inclination;

a blade assembly, the blade assembly comprising a first substantially planar, laterally orientable cutting blade and a second substantially planar, longitudinally orientable cutting blade, the orientable cutting blades comprising opposing ornamental blade surfaces and being hingedly joined to one another about a common axis for enabling a user to selectively vary blade angles, the variable blade angles extending intermediate the orientable cutting blades, the first and second cutting blades for vertically sectioning the food preparation from the food surface to the food bottom intermediate adjacent food portions; and a force-imparting handle assembly, the force-imparting handle assembly comprising downwardly-directed blade-engaging structure and upwardly directed manually operable handle assembly structure, the blade-engaging structure comprising radially extending blade-receiving grooves, the handle assembly structure comprising a hand-grip portion and handle assembly-release means, the hand-grip portion being substantially parallel to the handle assembly-release means and orthogonal to the blade-receiving grooves, the blade-receiving grooves receiving the orientable cutting blades thereby fixing the variable blade angles, the fixed variable blade angles being equal in magnitude, the handle assembly release means selectively attaching the force-imparting handle assembly to the blade assembly, the hand grip portion enabling a user to manually impart vertically directed forces to the blade assembly, the food preparation being sectioned into a plurality of food sections via the downwardly directed orientable cutting blades, the orientable cutting blades thus corralling the food sections, each food section comprising at least two vertical, substantially planar adjacent section walls, and an arcuately angled section wall, the downwardly directed cutting blades thereby providing planar barriers between the corralled food sections and matter external to the corralled food sections, at least one select food section being removable from the food preparation container for creating a section vacancy, the planar barriers for preventing the bulk food portions from entering the section vacancy, the ornamental blade surfaces for providing at least one ornamentally-bound section vacancy, the food presentation assembly thus sectioning the food preparation and displaying a portion thereof.

2. The food-presentation system of claim 1 wherein the orientable cutting blades comprise blade apertures, the blade apertures extending intermediate the opposing ornamental surfaces, the blade apertures for facilitating food preparation sectioning and for providing at least one apertured, ornamentally-bound section vacancy.

3. The food-presentation system of claim 1 wherein the blade assembly comprises a third substantially planar orientable cutting blade, the third cutting blade being cooperable with the first and second cutting blades for forming six equally sized food sections.

4. The food-presentation system of claim 1 wherein the food preparation and the blade assembly are cooperably removable from the food preparation container, the blade assembly thereby providing food service stations for enhancing food section removal from the blade assembly.

5. The food-presentation system of claim 1 wherein the blade-receiving grooves comprise a groove width, the groove widths being sized and shaped for selectively receiving paired, sandwichable cutting blades, the force-imparting handle assembly and the sandwichable cutting blades for enabling a user to selectively form a select number of equally-sized food sections, the select number of food sections being selected from the group consisting of six food sections and twelve food sections.

6. The food-presentation system of claim 1 wherein the cutting blades are hingedly joined at a blade junction, the blade junction having an inferior junction end, the inferior junction end comprising pointed structure, the pointed structure for piercing the bulk food portion at the blade junction and for preventing bulk food portion compaction when the food preparation is sectioned into a plurality of food sections.

7. The food-presentation system of claim 1 wherein the handle assembly-release means are uni-finger operable for selective push-button release of the force-imparting handle assembly from the blade assembly.

8. A food-sectioning assembly, the food-sectioning assembly for radially sectioning a food preparation into a plurality of food sections, the food-sectioning assembly comprising:
a food preparation container, the food preparation container comprising a circular container bottom and a peripheral container wall, the container wall being integrally formed to the container bottom extending upwardly therefrom;
a blade assembly, the blade assembly comprising radially orientable cutting blades, the cutting blades comprising opposing ornamental blade surfaces and being pivotally joined to one another about a common axis for enabling a user to selectively vary blade angles, the variable blade angles extending intermediate the pivotally joined cutting blades, the cutting blades for vertically sectioning a food preparation, the food preparation being receivable in the food preparation container; and
a force-imparting handle assembly, the force-imparting handle assembly comprising downwardly-directed blade-engaging structure and upwardly directed manually operable handle assembly structure, the blade-engaging structure comprising radially extending blade-receiving grooves, the handle assembly structure comprising a hand-grip portion and handle assembly-release means, the hand-grip portion being substantially parallel to the handle assembly-release means and orthogonal to the blade-receiving grooves, the blade-receiving grooves receiving the cutting blades thereby fixing the variable blade angles, the handle assembly-release means selectively attaching the force-imparting handle assembly to the blade assembly, the hand grip portion enabling a user to manually impart vertically directed forces to the blade assembly, the cutting blades for radially sectioning the food preparation into a plurality of food sections and for selectively corralling the food sections.

9. The food-sectioning assembly of claim 8 wherein the cutting blades comprise blade apertures, the blade apertures extending intermediate the opposing ornamental surfaces, the blade apertures for facilitating food preparation sectioning and for providing at least one apertured, ornamentally-bound section vacancy.

10. The food-sectioning assembly of claim 8 wherein the food preparation and the blade assembly are cooperably removable from the food preparation container, the blade assembly thereby providing food service stations for enhancing food section removal from the blade assembly.

11. The food-sectioning assembly of claim 8 wherein the blade-receiving grooves comprise a groove width, the groove widths being sized and shaped for selectively receiving paired, sandwichable cutting blades, the force-imparting handle assembly and the sandwichable cutting blades for enabling a user to selectively form a select number of equally-sized food sections, the select number of food sections being selected from the group consisting of an even number of food sections and a multiple of the even number of food sections.

12. The food-sectioning assembly of claim 8 wherein the pivotally joined cutting blades form a blade junction, the blade junction having an inferior junction end, the inferior junction end comprising pointed structure, the pointed structure for piercing the food preparation at the blade junction and for preventing food compaction when the food preparation is sectioned.

13. The food-sectioning assembly of claim 8 wherein the handle assembly release means are uni-finger operable for selective push-button release of the force-imparting handle assembly from the blade assembly.

14. A food-sectioning assembly, the food-sectioning assembly for sectioning a bulk food portion into a plurality of food sections, the food-sectioning assembly comprising:

a blade assembly, the blade assembly comprising radially orientable cutting blades, the cutting blades being pivotally joined to one another about a common axis for enabling a user to selectively vary blade angles, the variable blade angles extending intermediate the pivotally joined cutting blades, the cutting blades for vertically sectioning a bulk food portion; and a force-imparting handle assembly, the force-imparting handle assembly comprising downwardly-directed blade-engaging structure and upwardly directed handle assembly structure, the blade-engaging structure comprising radially extending blade-receiving grooves, the handle assembly structure comprising a hand-grip portion and handle assembly-release means, the hand-grip portion being substantially parallel to the handle assembly-release means and orthogonal to the blade-receiving grooves, the blade-receiving grooves receiving the cutting blades for fixing the variable blade angles, the handle assembly release means selectively attaching the force-imparting handle assembly to the blade assembly, the hand grip portion enabling a user to manually impart vertically directed forces to the blade assembly, the cutting blades for sectioning the bulk food portion into a plurality of food sections.

15. The food-sectioning assembly of claim 14 wherein the cutting blades each comprise opposing blade surfaces and at least one blade aperture, the blade apertures extending intermediate the opposing surfaces, the blade apertures for facilitating food portion sectioning.

16. The food-sectioning assembly of claim 14 wherein the food preparation and the blade assembly provide food service stations for enhancing food section removal from the blade assembly.

17. The food-sectioning assembly of claim 14 wherein the blade-receiving grooves comprise a groove width, the groove widths being sized and shaped for selectively receiving paired, sandwichable cutting blades, the force-imparting handle assembly and the sandwichable cutting blades for enabling a user to selectively form a select number of food sections, the select number of food sections being selected from the group consisting of an even number of food sections and a multiple of the even number of food sections.

18. The food-sectioning assembly of claim 14 wherein the pivotally joined cutting blades form a blade junction, the blade junction having an inferior junction end, the inferior junction end comprising pointed structure, the pointed structure for piercing the food preparation at the blade junction and for preventing food compaction when the bulk food portion is sectioned.

19. The food-sectioning assembly of claim 14 wherein the handle assembly release means are uni-finger operable for selective push-button release of the force-imparting handle assembly from the blade assembly.

20. The food-sectioning assembly of claim 14 comprising a food preparation container, the food preparation container comprising a container bottom and a peripheral container wall, the container wall being cooperable with the container bottom extending upwardly therefrom at a container angle of inclination, the container angle of inclination for enabling food access via the container wall.

* * * * *